(12) United States Patent
Zaslavsky et al.

(10) Patent No.: US 7,873,972 B2
(45) Date of Patent: Jan. 18, 2011

(54) METHOD AND APPARATUS FOR GENERATING A MOSAIC STYLE ELECTRONIC PROGRAM GUIDE

(75) Inventors: Eduard Zaslavsky, Maple (CA); Lev Olkha, North York (CA)

(73) Assignee: JLB Ventures LLC, Washington, DC (US)

( * ) Notice: Subject to any disclaimer, the term of this patent is extended or adjusted under 35 U.S.C. 154(b) by 1493 days.

(21) Appl. No.: 10/157,574

(22) Filed: May 28, 2002

(65) Prior Publication Data

US 2003/0014752 A1  Jan. 16, 2003

Related U.S. Application Data

(60) Provisional application No. 60/295,057, filed on Jun. 1, 2001.

(51) Int. Cl.
*G06F 3/00* (2006.01)
*G06F 13/00* (2006.01)
*H04N 5/445* (2006.01)
*H04N 5/222* (2006.01)

(52) U.S. Cl. .............................. 725/41; 725/38; 725/44; 725/49; 348/333.05; 348/333.11

(58) Field of Classification Search .................... 725/38, 725/41, 44, 49; 348/333.05, 333.11
See application file for complete search history.

(56) References Cited

U.S. PATENT DOCUMENTS

| | | | | |
|---|---|---|---|---|
| 5,526,034 A | | 6/1996 | Hoarty et al. | |
| 5,550,578 A | | 8/1996 | Hoarty et al. | |
| 5,550,960 A | * | 8/1996 | Shirman et al. | 345/582 |
| 5,583,560 A | * | 12/1996 | Florin et al. | 725/40 |
| 5,809,204 A | * | 9/1998 | Young et al. | 386/83 |
| 5,822,014 A | * | 10/1998 | Steyer et al. | 725/41 |
| 5,850,218 A | * | 12/1998 | LaJoie et al. | 725/45 |
| 5,940,073 A | * | 8/1999 | Klosterman et al. | 715/721 |
| 6,034,678 A | | 3/2000 | Hoarty et al. | |
| 6,100,883 A | | 8/2000 | Hoarty | |
| 6,111,614 A | * | 8/2000 | Mugura et al. | 348/569 |
| 6,154,203 A | * | 11/2000 | Yuen et al. | 725/52 |
| 6,205,582 B1 | | 3/2001 | Hoarty | |
| 6,219,837 B1 | * | 4/2001 | Yeo et al. | 725/38 |
| 6,393,163 B1 | * | 5/2002 | Burt et al. | 382/294 |
| 6,405,371 B1 | * | 6/2002 | Oosterhout et al. | 725/39 |
| 6,539,545 B1 | * | 3/2003 | Dureau et al. | 725/48 |
| 6,621,509 B1 | * | 9/2003 | Eiref et al. | 715/836 |
| 6,938,208 B2 | * | 8/2005 | Reichardt | 715/719 |
| 7,174,512 B2 | * | 2/2007 | Martin et al. | 715/719 |
| 7,694,320 B1 | * | 4/2010 | Yeo et al. | 725/41 |
| 2002/0069265 A1 | * | 6/2002 | Bountour et al. | 709/219 |
| 2004/0080673 A1 | * | 4/2004 | Townsend et al. | 348/563 |

\* cited by examiner

*Primary Examiner*—Haong-Vu A Nguyen-Ba
(74) *Attorney, Agent, or Firm*—Banner & Witcoff, Ltd.

(57) ABSTRACT

In one embodiment, there is provided a method for operating a decoder. The method comprises receiving, on a first channel, an electronic program guide data stream comprising multiple video streams which have been encoded and multiplexed for transmission on the first channel, each video stream comprising a low resolution version of a high resolution video stream which is being simultaneously received on a separate channel; decoding the electronic program guide data stream into frames, each frame defining a mosaic-style image comprising image areas for images in the electronic program guide data stream corresponding to images from each of the multiple video streams; and displaying each of the frames on a display screen coupled to the decoder.

34 Claims, 19 Drawing Sheets

METHOD AND APPARATUS FOR GENERATING A MOSAIC STYLE ELECTRONIC PROGRAM GUIDE

PRIORITY

The present application hereby claims the benefit of the filing date of a related Provisional Application filed on Jun. 1, 2001, and assigned Application Ser. No. 60/295,057, and is hereby incorporated by reference.

FIELD OF THE INVENTION

The present invention pertains to electronic programming guides ("EPGs").

BACKGROUND

EPGs may be used to provide television viewers with on-screen television schedule information, e.g. in a convenient regular or non-regular rectangular grid format. In one EPG, used in conjunction with analog television systems, one of the cable channels is reserved for displaying programming information. The programming information is displayed in a grid, e.g. grid 2 of FIG. 1. Grid 2 comprises four columns 3-6. First column 3 lists the various channels of the cable broadcast system. Columns 4, 5 and 6 indicate what is showing on the channels listed in column 3 in half-hour increments. Thus, if one tunes to the EPG at 10:35 p.m., second column 4 displays what is showing between 10:00 and 10:30 p.m., third column 5 displays what is showing between 10:30 and 11:00 p.m., and fourth column 6 displays what is showing between 11:00 p.m. and 11:30 p.m. A row 7 at mid-screen indicates what time slots columns 4 to 6 correspond to (a portion 8 of screen 9 above row 7 usually provides continuous advertisements). In most cable TV systems, there are more television channels than there is space for rows in grid 2. Accordingly, grid 2 typically scrolls at a pre-selected slow rate, so that a viewer can see what is showing on all of the channels. The information contained in an analog EPG is typically broadcast by a cable operator on a dedicated one of the channels of the cable TV system.

Most digital EPGs operate in a different way. In a digital EPG, program schedule information, and sometimes applications and/or systems software, is transmitted to equipment located on the viewer's premises (usually referred to as a digital "set-top box" or STB) by way of broadcast, cable, direct satellite or some other suitable form of transmission. The STB contains memory (and is in essence a dedicated computing device) so that the program schedule information can be stored for later viewing. The program schedule information stored in the STB is periodically updated (e.g., on a continuous, daily, weekly, or biweekly basis). A microprocessor within the STB cooperates with the viewer's television set to display the stored program schedule information and to implement other functions of the EPG in response to user-generated signals. The functions available depend on the sophistication of the particular EPG.

Digital EPGs are often used in an interactive television system. In an interactive television system EPG, a user may browse schedule information in any order, select programs from on-screen menus for current or future viewing and order pay-per-view programming on demand. Some EPGs permit other functions, e.g. an e-mail function, or a function that permits a user to block certain kinds of programs such as adult or violent programs.

Collectively, prior EPGs fail to provide viewing capabilities that realistically address the viewing habits of the users of these systems. As mentioned above, an analog TV EPG is viewed on a TV screen as a permanently scrolling rectangular table. This solution does not require from users any additional interaction and is suitable for a completely passive television viewer (the so-called "couch potato"). Unfortunately, this is a poor solution for interactive TV, because:

1. The scrolling speed is constant and cannot be adjusted.
2. In an analog EPG system, the user cannot switch to the channel of choice immediately from the EPG (e.g. by clicking on a display of a channel number on the EPG). Instead, the user must input the channel number with a remote controller.
3. The analog EPG scrolling table is completely sequential (providing information in an order depending upon channel number) and the user cannot pre-sort schedule data or otherwise personalize the EPG.

A two-way interactive EPG is more sophisticated. Unfortunately this solution also has many problems. Interactive EPG systems provide dropdown menus that require multiple steps in order to interact with the EPG, which is very frustrating when a search for a desired program is unsuccessful. The EPG is inflexible in terms of menu design, because the menu itself is a set of regular two-dimensional grids.

Some of the other problems with prior art EPGs are as follows:

1. Program Description Truncation.

When displaying schedule information in a grid format, i.e., columns representing time slots and rows representing channels, program titles are generally truncated to fit into the cells of the grid. The width of a grid cell varies with the program duration. Since a 30 minute program is allotted only a small space for the program title and description, titles and/or descriptions for half and even full hour programs often must be truncated to fit in the allotted space. Some systems simply cut off the description of a program without abbreviating it in any way, such that the user cannot determine the subject matter of the program. Although some systems partially alleviate this problem by providing two lines of text in each grid cell, this solution is not ideal because program descriptions may still be truncated.

2. Inability to Simultaneously Channel Surf and View EPG.

Prior EPGs lack a method for creating a viewing itinerary electronically while a user concurrently views a program on the television screen. In other words, when a user views a program on a particular channel, he or she cannot electronically set up a sequence of other channels to surf. Moreover, these prior EPGs leave much guess work for the user as he or she navigates through a sequence of channels. When skimming through channels and trying to determine what program is being displayed on a channel, commonly known as "channel surfing," the user must guess which program is currently being aired from the video segment encountered during channel surfing. Since much—in some cases, up to 30%—of the programming appearing on a channel at any given time is advertising, the user is not provided with any clues as to what program is appearing on a selected channel at a given time. Therefore, the user must wait until the advertisement or commercial ends before learning which program is appearing on the selected channel. Thus, a need exists for an EPG that displays current program schedule information for each channel at the same time that the user surfs through the channels.

3. Small Text Size.

Unfortunately, current EPGs allow for only one font size. However, human beings do not all have the same acuity of vision. Therefore, some viewers may be unable to read the information in the EPG.

4. Specular Highlighting.

Existing EPGs provide only a very rudimentary lighting capability. In other words, existing EPGs do not have a very sophisticated ability to adjust the brightness of the EPG. This detracts from the utility of the EPG.

In most electronic programming guides (EPGs) known to the inventor, and in those known in the art, when a viewer wants to select a program, the EPG presents a list of available programs, typically in the form of a text list (an example of which is shown in FIG. 2). In some cases known to the inventor, the text may have an additional small picture, entry, or logo pertaining to a specific item in the list of programs. For example, an image of a football may appear, referring to a listed football game, or an image of a bat and ball may refer to a listed baseball game.

However, in some cases it would be more helpful to the viewer in selecting a program to see in real time what is currently playing on all the listed channels, and thus to receive quick impressions of the programs currently in progress. Thus, a system that would allow a viewer to preview multiple thumbnail-sized images of actual real-time programming on the various channels that are listed in the EPG, using currently known methods for selecting channels is needed.

Further, an enhanced method of presenting a mosaic-style EPG allowing free choice or a precombined choice is needed, based on the limitations and capabilities of the Set Top Box (both Hardware and Software) In many cases, the STB or video system contains an MPEG decoder that has a limitation of 8 PIDs (process IDs). Two or three of these PIDs are taken up with data communication, so typically there is a maximum of perhaps four video streams that can be decoded. However, in a mosaic-type EPG it is very often desirable to offer 6, 9, 16, or even 20 or 25 video streams, but that is not possible if only a total of 8 PIDs are available, which is currently the limitation in many MPEG decoder chips. Thus, an enhanced method of presenting a mosaic-style EPG that allows the number of preview channels to exceed the limitations imposed by today's MPEG decoders is needed.

SUMMARY

According to one aspect of the invention there is provided a method for generating electronic program guide data. The method comprises combining a number of input video streams into a single output video stream; and transmitting the single output video stream to a plurality of receivers.

BRIEF DESCRIPTION OF THE DRAWINGS

FIG. 3C illustrates an EPG using faces of a polyhedron to show thumbnail displays of different programs;

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention relate to an EPG system that provides a user with schedule information for broadcast programs (including cablecast, or datacast programs) viewed by the user on a television or a PCTV (a PCTV is a personal computer having the capability of displaying video programs). Embodiments of the invention also relate to an improved EPG that uses a 3D graphics pipeline to display images, alphanumeric text and video data and provides the user with a more powerful and convenient television in a desktop environment, while simultaneously increasing the efficiency of navigation by the user through the EPG.

Figure 2:
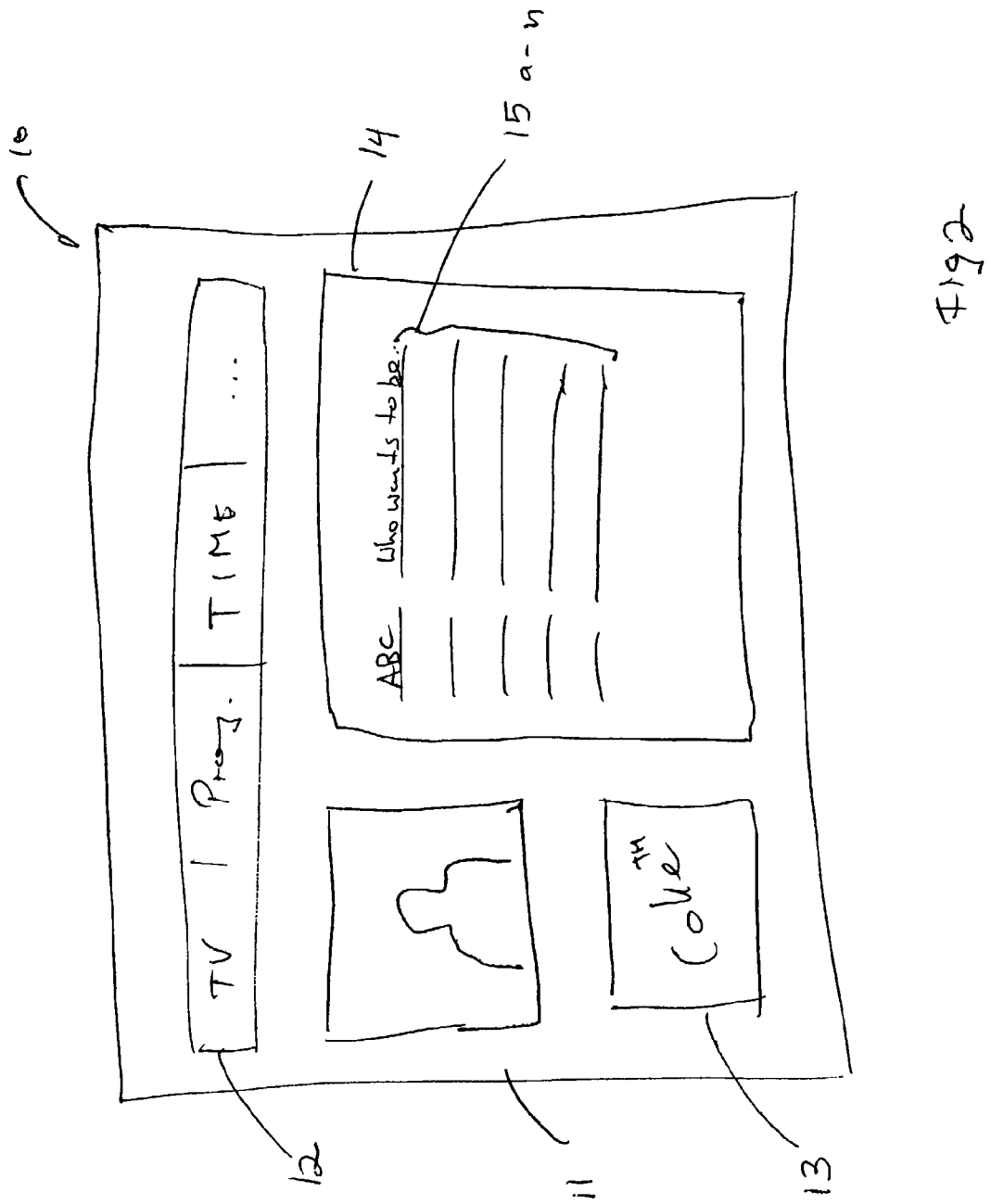
FIG. 2 shows another EPG display in accordance with the prior art.

FIG. 2 shows a typical layout of an EPG known to the inventor. Screen 10 contains typical elements, such as a toolbar 12 that lets viewers select one type of system function from among various functions, such as television, games, interactive online banking or other services, etc. As in this example television is the selected system function, the toolbar also offers menu items to let the viewer select the type of programs, the time slots, and other parameters that determine the program listings displayed in the EPG. All these parameters are combined in one of many ways known to the inventor and known in the art, resulting in a text list presented in a window or section of the screen 14 and containing the elements 15 a through n. Also in some cases the EPG may include other windows, such as, for example, a window 11 presenting the currently turned channel and also, as another example, an advertisement window 13 showing an advertising image.

Figure 1:
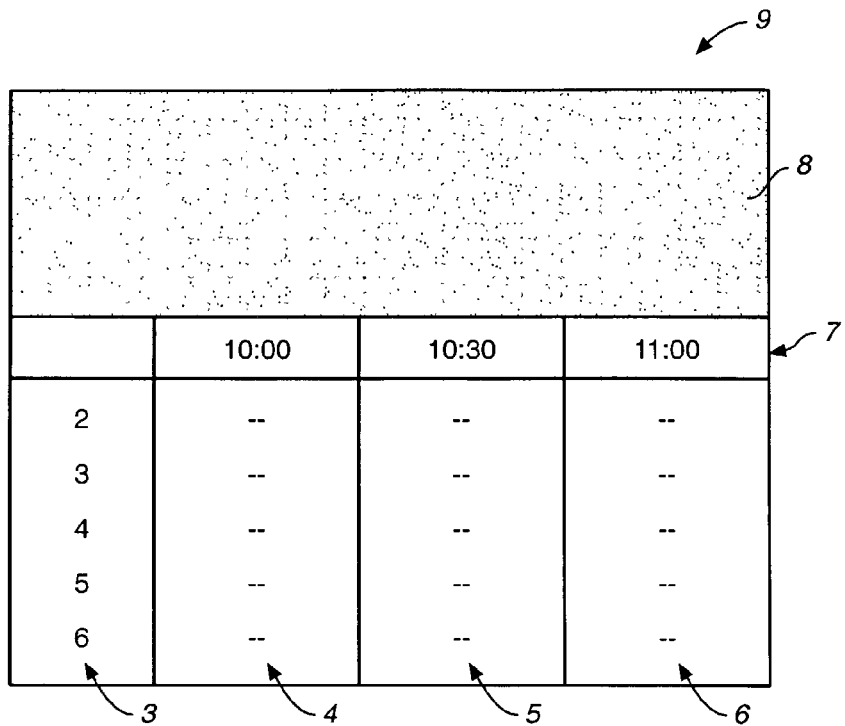
FIG. 1 shows an EPG display in accordance with the prior art.
Figure 3A:
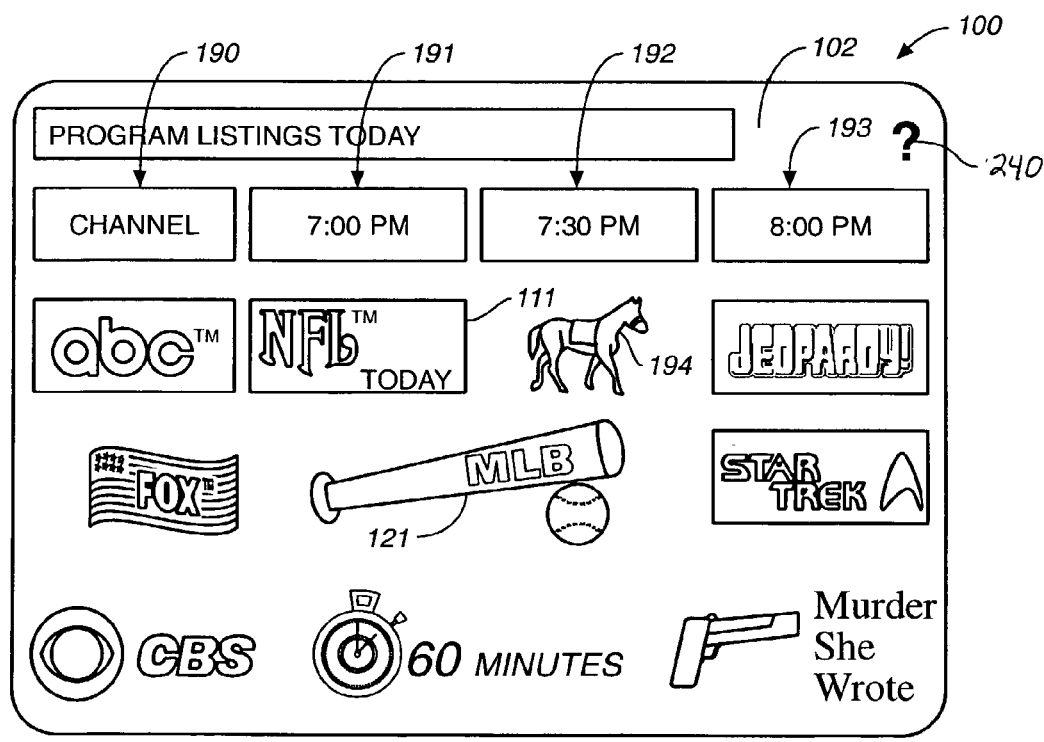
FIG. 3A illustrates an EPG display including a set of columns indicating what is being shown on television during various time periods.
Figure 3:
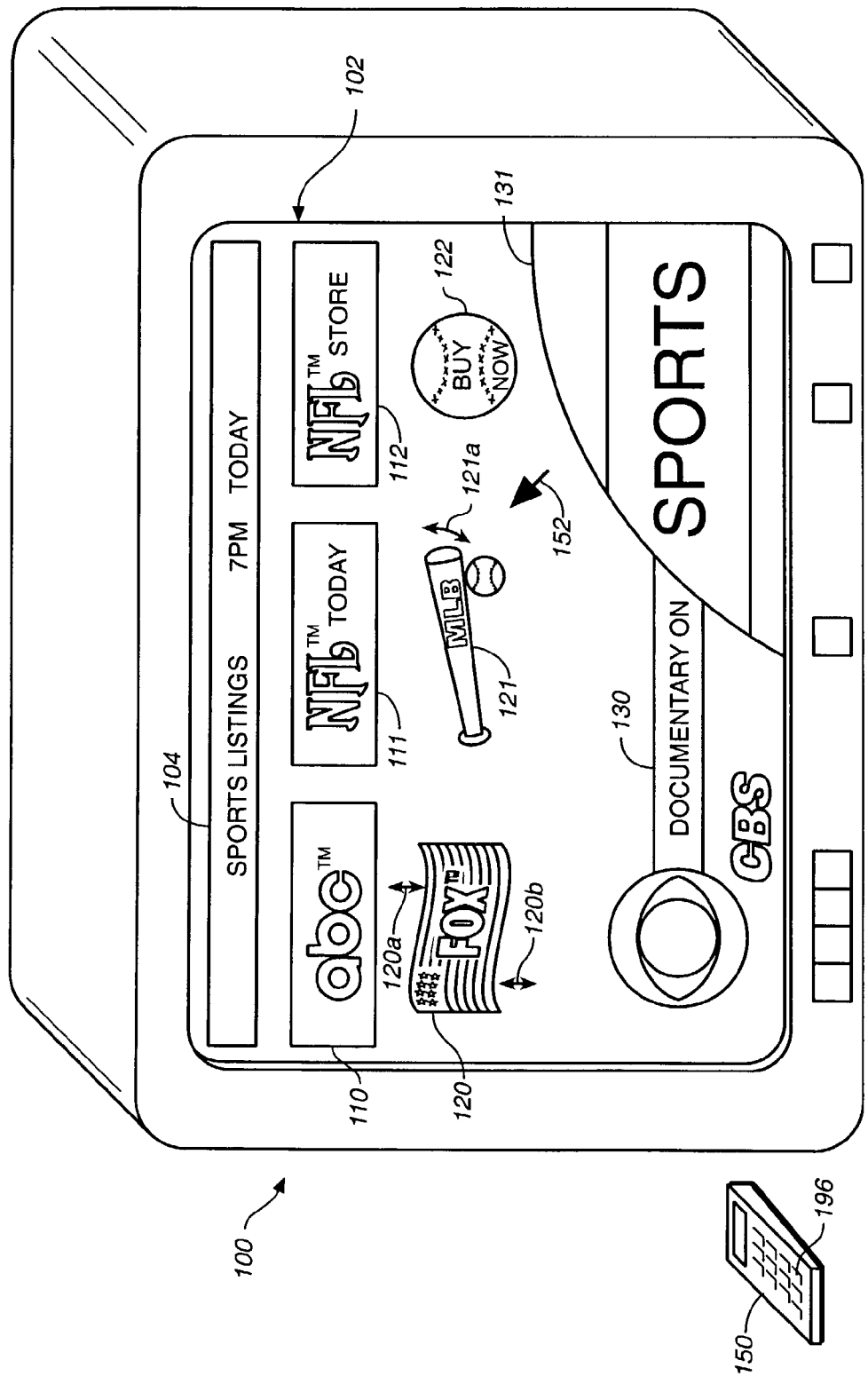
FIG. 3 illustrates an EPG display in accordance with the present invention.

FIG. 3 shows a television system 100 comprising a video screen 102 in accordance with the invention. Screen 102 is shown in a slight isometric aspect to allow some of the banners such as 110, 111, 120 etc. to be visibly skewed, as in 3D space. In many cases, the normal view would actually be perpendicular to the viewer's line of sight. An EPG in accordance with the invention can be put in any of several modes. In one mode, the EPG is programmed to list television programs of a particular type, e.g. sports programs, movies, children's programs, sitcoms, etc. In the example displayed in FIG. 3, the EPG lists sports programs. In another mode (not shown), the EPG lists movies that are currently being shown on television. In another mode, the EPG lists all programs, regardless of the type of program, in the order of the television station number. In another mode, the EPG lists programs alphabetically. A user can select the EPG mode by actuating appropriate control buttons on a remote control device 150. In FIG. 3, a rectangular title bar 104 indicates the type of programs listed by the EPG. In particular, title bar 104 indicates that the programs listed by the EPG are sports programs. The selected listings, as an example only, include three columns, the first of which identifies the various television stations (110, 120, etc.), the second column identifies the program (111, 121, etc.) and the third column identifies special activities such as merchandising (112, 122, etc.).

Figure 3B:
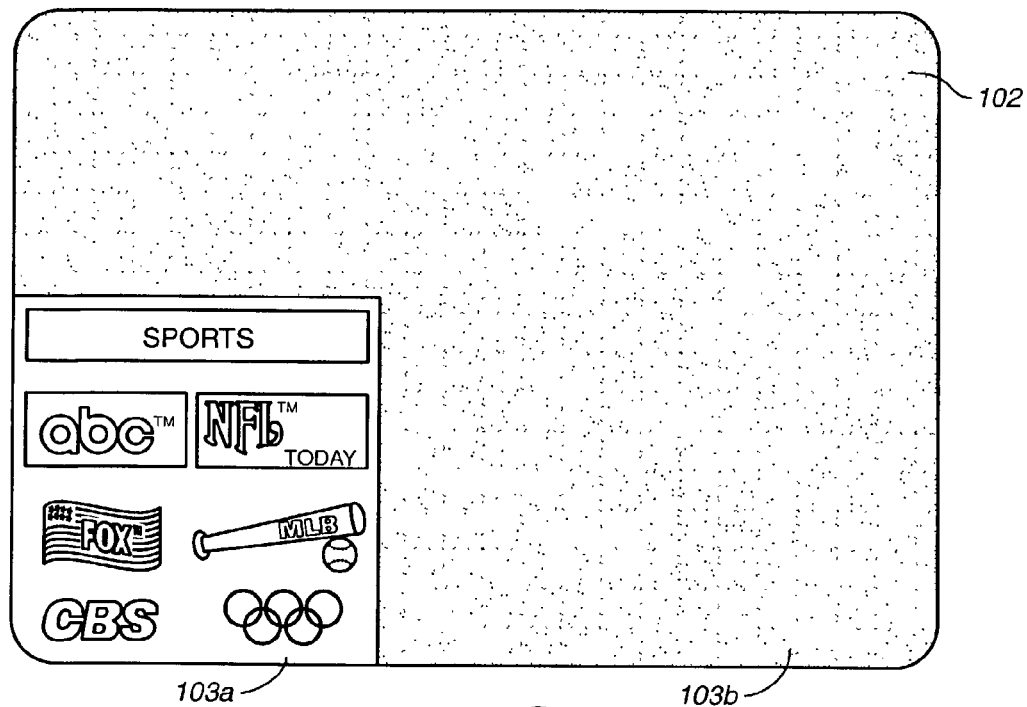
FIG. 3B illustrates an EPG display in a window region within a television screen.
Figure 3C:
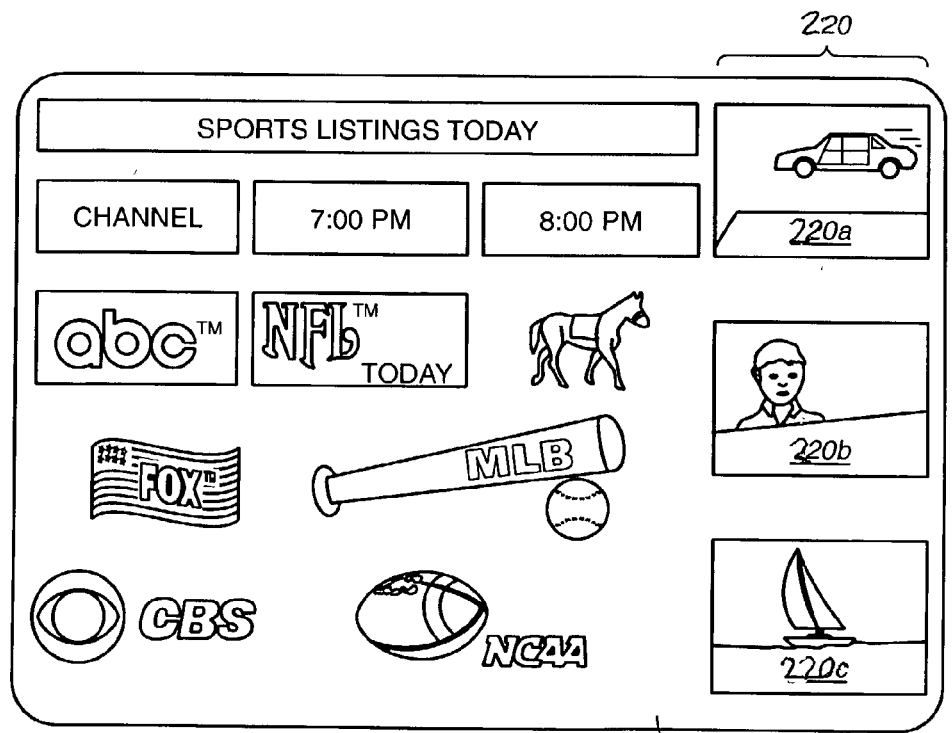
FIG. 3C illustrates an EPG display comprising a region for showing thumbnail displays of different programs.
Figure 3C:
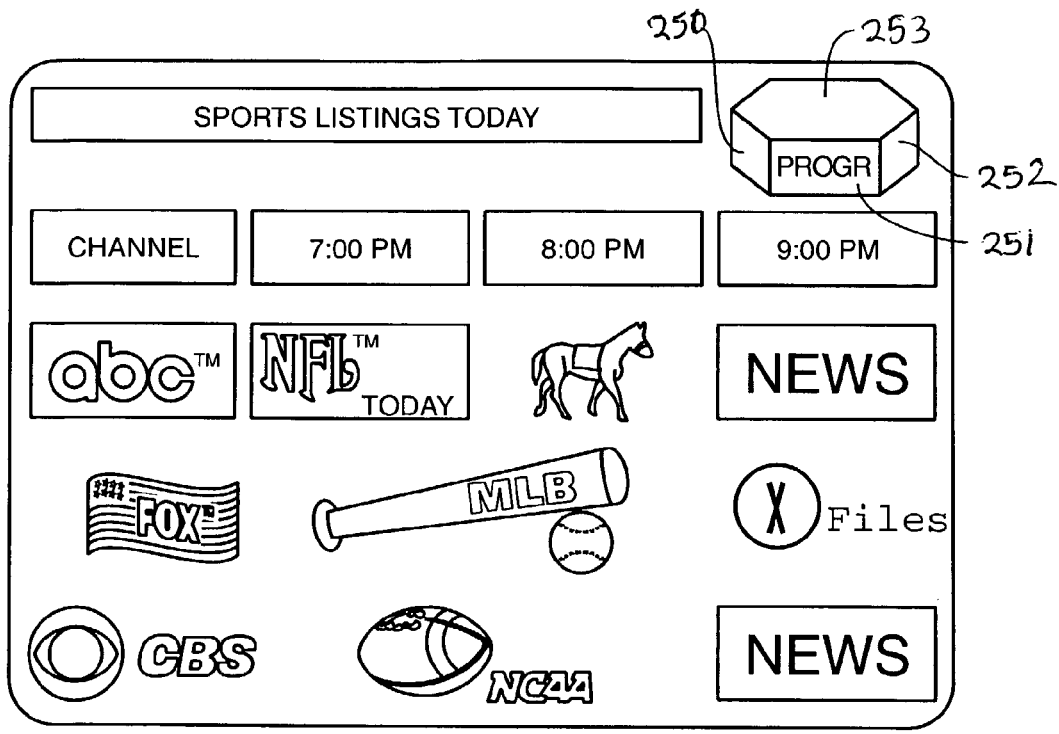
Figure 3D:
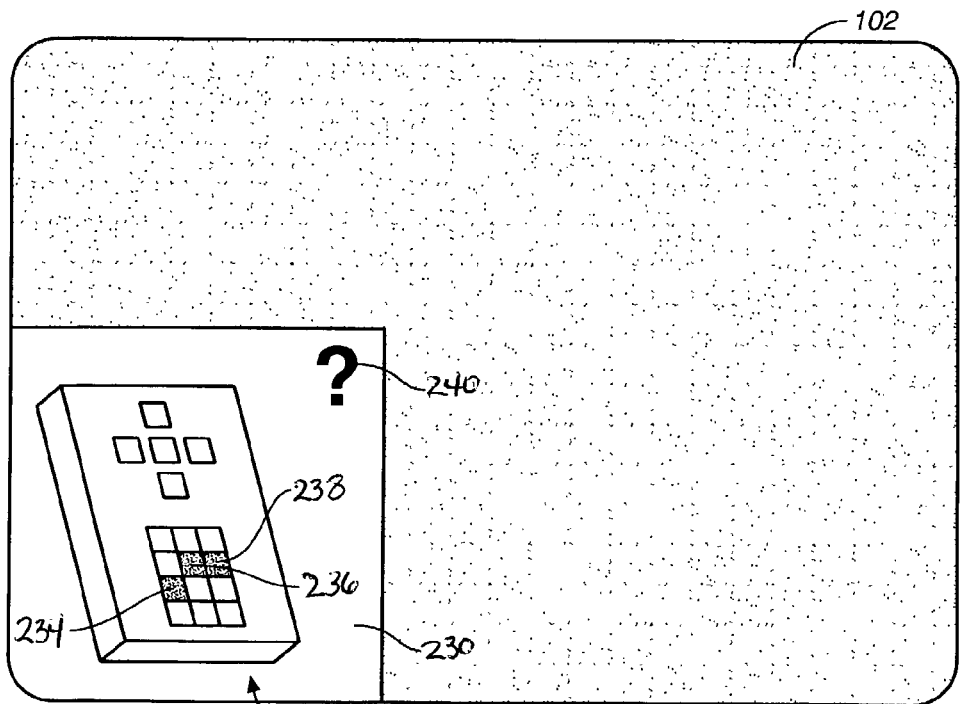
FIG. 3D illustrates and EPG displaying a window which remote control keys can be pushed.

Rather than displaying a matrix of rectangular boxes containing text as shown in FIG. 3, 3D objects with real shapes can be displayed on screen 102 along with rectangular or bar shaped text blocks. For example, display element 110 shows "ABC™" in a rectangular block, while display element 120 shows FOX™ as a waving flag, symbolically indicated by arrows 120a and 120b. One example of a method for displaying such an image using 3D accelerator technology is discussed below.

Display element 121 is a baseball and bat, thereby indicating that the show in question is a baseball game. Again, motion of the bat is symbolically indicated by arrow 121a. Display element 111 is a text block, indicating that a program being shown is a football game. It is thus seen that the EPG can use both pictograms and text blocks to indicate what program is being shown. However, in other embodiments, only pictograms are used. The pictograms and/or text blocks can be displayed using colors that help identify what program is being shown.

The EPG is typically used in conjunction with a remote control device, e.g. remote control device 150. Remote control device 150 can communicate with television system 100 in any of a number of ways, e.g. infrared signals, radio signals, or a cable connection. In one embodiment, the remote control device contains a mechanism by which the user can manipulate a cursor, e.g. cursor 152 on screen 102. Remote control device (remote controller) 150 can comprise a joystick, track ball, touch pad, mouse, a set of up/down left/right buttons, lever, or other type of control mechanism. The user can move cursor 152 to image 110 to select and watch the program playing on the channel corresponding to image 110 (in this example, ABC™). Alternatively, the user can move cursor 152 to image 120 to watch the program playing on the channel corresponding to image 120. Alternatively, the viewer can click on image 111 to watch the program corresponding to image 111 (in this case, a NFL™ football game).

As mentioned above, remote controller 150 can use any of a number of transmission techniques to communicate with television system 100. In addition, remote controller 150 can be a dedicated for use with television system 100 (e.g. incorporating a single command set for use with system 100), or remote controller 150 can be designed for use in conjunction with different types of devices in addition to television system 100. In addition, remote controller 150 can be programmable so that it can implement different types of command sets. (An example of a remote controller having such programmable capabilities is discussed in U.S. Pat. No. 4,918,439, issued to Wozniak et al.)

As mentioned above, the third column of images on screen 102 depicts icons or pictograms relating to merchandising. Screen 102 depicts logos or pictograms pertaining to merchandise that can be displayed and purchased using television system 100. For example, adjacent to logo 121 indicating that a baseball game is being shown on a particular station, a large baseball logo 122 appears, indicating that baseball-related products can be viewed and ordered by clicking on logo 122. A user can use cursor 152 to click on these logos to obtain information about the items being sold. For example, a user can click on baseball 122 to access information concerning merchandise that can be purchased using his or her interactive television system. When the user does this, information is downloaded from an information source and displayed on screen 102. This information pertains to products that can be purchased from a vendor. In one embodiment, this information is downloaded from a wide area network ("WAN") such as the Internet. Alternatively or concurrently, the information can be provided by the broadcaster that provides the television programs to television system 100. (This information can be provided on a dedicated channel).

Figure 4:
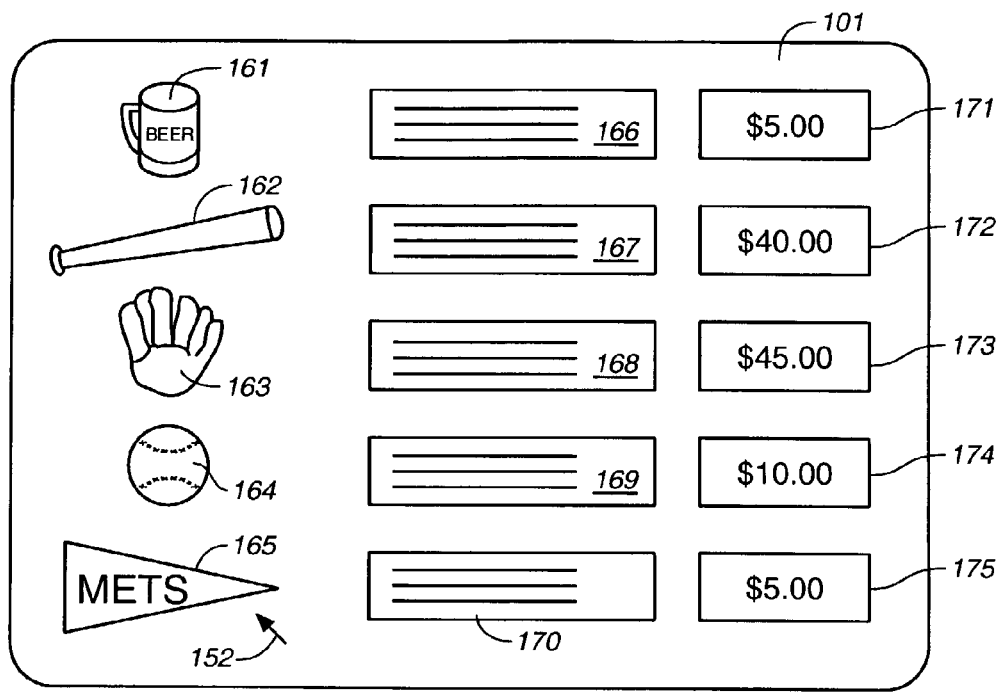
FIG. 4 illustrates a television screen displaying information concerning products that can be purchased using the EPG.

Alternatively, the information can be embedded in one of the blanking periods of the television signal, or embedded by any other suitable method compatible with the relevant analog and/or digital broadcast and encryption standards.) When the user clicks on baseball 122, information such as a web page is displayed on screen 102, listing various items that can be purchased, e.g. baseballs, bats, gloves, baseball cards, beer mugs, team banners, etc. For example, a page such as that shown in FIG. 4 can be displayed, illustrating the various items 161 to 165 that can be purchased, information in text blocks 166 to 170 concerning those items, and boxes 171 to 175 indicating the price of those objects.

In one embodiment, the user can move cursor 152 to a picture of one of the items and click on that item to purchase it. (There are different control elements known for moving cursors including but not limited to such as mice, trackballs, gloves, keys, touchpads, joysticks etc. One or more of these control elements can be used to move cursor 152. As mentioned above, one or more of these control elements are typically incorporated in remote controller 150 for this purpose.) When a user clicks on one of items 161-165, a signal is communicated to the cable broadcast system, and the purchaser's order is processed. This can be accomplished using hardware similar to that discussed in U.S. patent application Ser. No. 09/449,016, filed by Kamen et al. on Nov. 24, 1999, incorporated herein by reference.

Television networks or cable or satellite system operators may display logos or alternatively, a combination of indicative icons and corporate logos on EPG screen 102. For example, if a baseball game is played in 3COM™ park in San Francisco, 3COM™ Corporation, for an additional fee, can have its logo inserted on screen 102 in lieu of or along with baseball and bat pictogram 121. Alternatively, in lieu of or along with baseball and bat pictogram 121, screen 102 may display logos of the teams playing. These logos can appear alone or placed on or adjacent to an image of a baseball to highlight the fact that the program in question is a baseball game. Numerous other combinations can also be displayed on screen 102.

Television stations can use special logos or pictograms to be displayed by the EPG for their show categories, such as a magnifying glass for mysteries (or, alternatively a handgun), a smiling face for sitcoms, a guitar for music videos, etc. These logos or pictograms facilitate recognizing a show.

In some embodiments, the EPG grid can display text blocks and pictograms corresponding to some programs. Accordingly, screen 102 can get crowded. However, it will remain easy to recognize the shows by the shape and/or motion of the displayed pictograms, especially compared with the rectangular text blocks used in current EPGs. Further, if the pictograms on screen 102 use different colors (particularly unique colors), this further enhances readability of an EPG in accordance with the present invention compared with currently existing EPGs.

In one embodiment, the text blocks appearing in the EPG, if any, can also have unique colors and or fonts, which make it easier to recognize them as well. In one embodiment, the user can program the EPG to modify the color and brightness of the different pictograms and text blocks, or to assign different color schemes to the pictograms or text blocks. Thus, a user might have all comedy-related pictograms or text blocks color-coded as bright blue, and all dramas are color coded as bright red. This further enhances the ability of the user to use the EPG to select desired programs with great ease. In particular, program types may be recognized, even if the text is too small to read. (The EPG typically receives information from the broadcaster indicating the types of programs being broadcast. The EPG can then display the program information in the appropriate color. This information can be received as part of the cable broadcast signal, or can be received from another source, e.g. a LAN or WAN.) The color of the various pictograms and text blocks can be modified by controlling the color of a "virtual lighting source" (described below) that is used to generate the image. Alternatively, the color of texture pixels used to generate the image can be modified. (As explained below, the various text blocks and pictograms are generated using a 3D graphics pipeline. This pipeline generates images by applying texture maps to one or more geometric surfaces, and applying a virtual light source to the textured surface or surfaces. The process by which this is done is described below.)

In one embodiment, the EPG pictograms and text blocks are scaled in the x and y directions to show expected run times. Alternatively, in another embodiment, the EPG pictograms and text blocks are scaled in the x and y directions to show their importance or rating on a scale, to which the viewer can subscribe. For example, in one embodiment, the user can subscribe to a movie rating service that rates the quality of movies. Information from the rating service can either be entered into the EPG system by the user, or by the cable system broadcaster. Exceptionally good films can be highlighted, e.g. by expanding the text block or pictogram associated with those films.

Similarly, the EPG can be programmed with information indicative of a user's tastes. Thus, if the system is programmed with information indicating that the user particularly enjoys sports programs, the EPG will highlight or expand those text blocks and pictograms corresponding to sporting events. Similarly, if the system has been programmed to indicate that the user prefers educational television, the EPG will highlight or expand those text blocks and pictograms corresponding to educational programs.

FIG. 3 illustrates an EPG display screen with three columns. In other embodiments, the EPG comprises more than three columns. For example, as shown in FIG. 3A, a first column 190 lists program channels, a second column 191 depicts programs currently playing, a column 192 depicts programs playing in the next half-hour, and a fourth column 193 depicts programs playing in the half hour after that. In FIG. 3A, baseball bat 121 spans columns 191 and 192, thereby indicating that the baseball game is expected to continue into the time slot corresponding to column 192. However, text block 111 does not extend into column 192. This indicates that the football game is not expected to extend into the time slot corresponding to column 192. As can be seen, a pictogram 194 indicates that after the football game, ABC™ will be showing a horse race.

EPG Window Region

As mentioned above, frequently a viewer will want to channel surf while being able to determine what program he or she has just turned to. If a commercial is playing, the viewer has no way of knowing what program is on. In one embodiment, the viewer can press a control button on remote controller 150 that causes a window 103a to open on screen 102 FIG. 3B). The EPG is displayed within window 103a. Thus, a user can channel surf and watch programs on portion 103b of screen 102, while simultaneously seeing an identification of the program that he or she is currently watching. This is particularly useful if a commercial is playing. In addition, the user can see what is playing on other channels, and he or she can click on pictograms or text blocks corresponding to those other channels (or pictograms or text blocks corresponding to the programs being shown on those other channels) to change the channel of the television system. This represents a major improvement over prior art EPGs, which typically take up an entire television screen. Thus, these prior art EPGs do not permit a user to simultaneously watch one channel while investigating what is on other channels.

EPG Embodiment Displaying Magnified Segments

In one embodiment, it may be desirable to permit a user to magnify portions of the EPG so that the user can get a better view of what is being displayed. Accordingly, remote controller 150 contains a button 196 that permits the user to expand a selected portion of the EPG display. This is schematically shown by a bar 130 that extends into a region 131 of screen 102. As can be seen, the portion of bar 130 extending into region 131 is magnified, so the viewer can more easily see what bar 130 represents. A user can control which portions of the EPG display are magnified by pressing button 196 and moving cursor 152 to a portion of the display that the viewer wants magnified.

EPG Embodiment Displaying 3D Images

Figure 5:
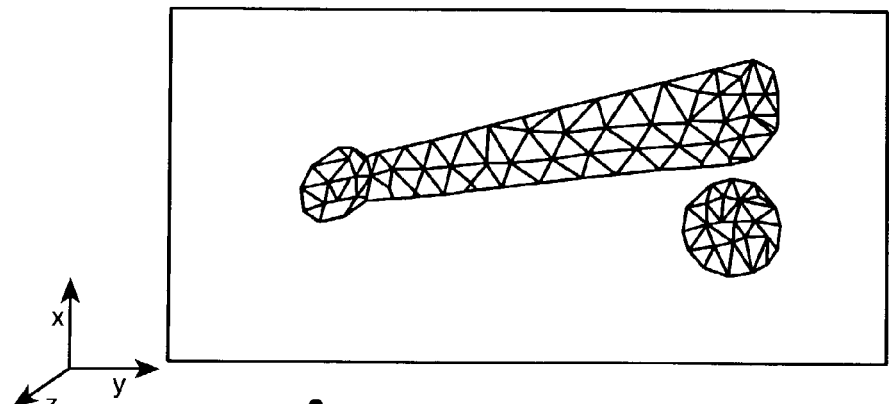
FIG. 5 illustrates a set of polygons depicting the surface of a pictogram object to be displayed on a television screen as one of the symbols that constitutes part of the EPG.

In one embodiment, the graphics circuitry that provides the information displayed on screen 102 stores the image elements in a 3D model and generates the image using a 3D accelerator. This is done in a manner similar to that described in our U.S. patent application Ser. Nos. 09/344,442 and 09/361,470, which are incorporated herein by reference. Briefly, this is accomplished by a) storing a computer model of a geometric surface of one or more pictograms in a first set of memory locations within the television STB; b) storing within a second set of memory locations a two dimensional image to be mapped onto that surface (e.g. a pixel array); and c) constructing a pixel array comprising image 121. For example, image 121 is typically generated in the following manner:

1. A computer model describing the object depicted by image 120 is received from a source such as the broadcaster or some other source and stored in one or more memory devices within the STB. The computer model is typically in terms of a) a set of geometric surfaces; and b) pixel data that is to be applied, or "bound" to those surfaces. The geometric surfaces can be defined in terms of a set of polygons, e.g. triangles. Each polygon is defined in terms of the x, y, z coordinates of its vertices. Alternatively, these surfaces can be defined in terms of a mathematical formula (i.e. "implicitly defined"). FIG. 5 schematically illustrates the polygons used to model the shape of the object depicted by image 121. FIG. 5 has the appearance of a wire frame model of polygons that show the shape of the surface and three-dimensional features (if any) of the object depicted by image 121. This wire frame model is not shown on screen 102, per se. Rather, FIG. 5 is merely provided to schematically indicate what kind of information is contained in the memory file that describes the geometric surfaces. Further information concerning the process of constructing a mesh of polygons is described in standard graphics libraries, such as REAL 3D™, published by REAL 3D™, a Lockheed Martin Corporation in 1996, and DIRECT 3D™, published by New Riders Publishing in 1997, each of which is incorporated herein by reference. The pixel data (contained in another memory file) includes information corresponding to colors and patterns to be applied to the polygons of FIG. 5. In the case of image 121, this would include a pixel array illustrating the appearance of wood, i.e. the wood finish of a baseball bat, the appearance of the baseball, and the letters "MLB™".

2. The pixel array data is then "bound" to the to mesh of polygons. This is accomplished by mapping polygon vertices to a location in the pixel array. This portion of the process is roughly analogous to an upholsterer choosing a piece of fabric, and binding it with a few nails to the corner of a couch being upholstered. The upholsterer subsequently asks his apprentice to finishing attaching the fabric to the couch. In this case, the 3D graphics accelerator finishes the task instead of an apprentice.

3. Thereafter, information is communicated to the 3D graphics accelerator within the STB identifying the location of a "virtual viewer." In other words, information is communicated to a 3D graphics accelerator identifying a point of reference P (FIG. 5) from which the object of image 121 is to be observed. Usually, point of reference P is a "default" position, and is simply some distance in front of the baseball bat. However, as explained below, a user can change the position P of this virtual viewer, e.g. with remote control device 150.

4. Information concerning a virtual lighting source is also communicated to the 3D graphics accelerator. This information can include a) the color of the light being provided by the lighting source; b) the brightness of this virtual lighting source; and c) whether the lighting source is diffuse or specular.

5. Thereafter, the 3D graphics accelerator within the STB generates image 121 (typically in the form of a pixel array) of the baseball bat as that baseball bat would be perceived by a virtual viewer if the virtual viewer were located at point P and the baseball bat were illuminated with the selected lighting source. The other pictograms, text blocks and images shown in FIG. 3 can be similarly generated. (As explained below, video programs and video clips can be bound to geometric surfaces for display on screen 102 as part of the EPG in a similar manner.)

As mentioned above, more details concerning the basic process of generating 3D images are discussed in the above-incorporated '442 and '470 applications. Also see Foley et al., "Computer Graphics" published by Addison-Wesley in 1996, incorporated herein by reference.

The fact that the various pictograms are generated in the above-described manner has a special significance for an EPG in accordance with the invention. In particular, the EPG maintains the various pictograms and blocks of the display in the form of a 3D object model. Thus, a user can "zoom" toward or away from the various pictograms of the EPG to make it easier to see what programs are being displayed. This is accomplished by pressing appropriate control buttons on remote controller 150 and causing the 3D graphics accelerator to regenerate the EPG images from a different reference point, e.g. a reference point closer to the baseball and bat. Thus, image 121 of the baseball and bat will appear larger on screen 102.

Figure 6:
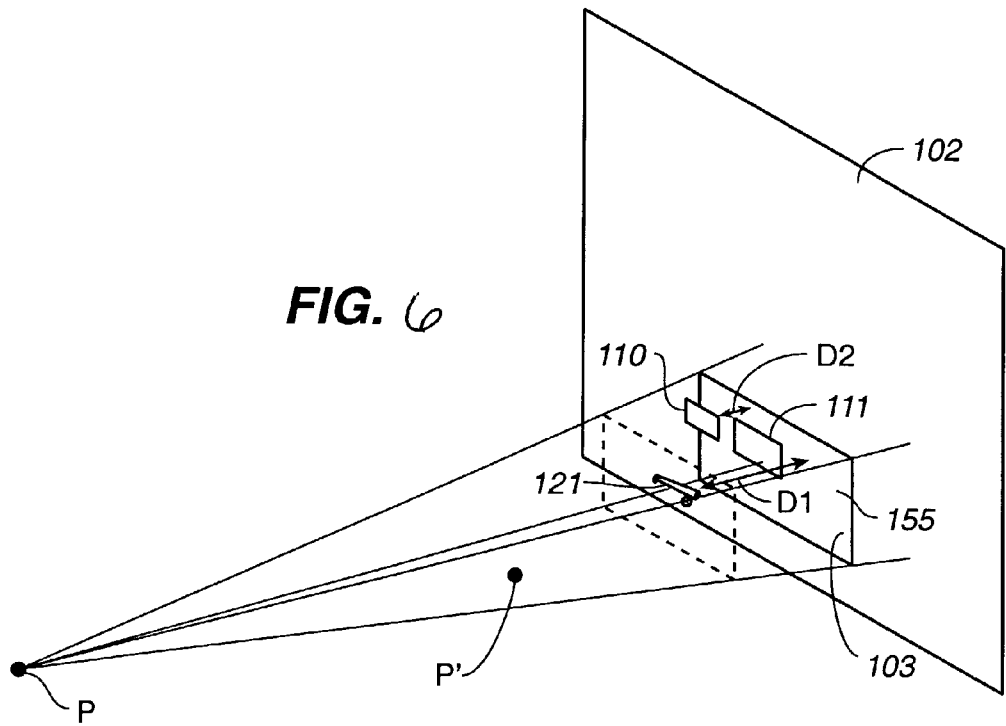
FIG. 6 schematically illustrates 3D aspects of the images displayed in the EPG and shows a manner in which an EPG in accordance with the present invention can be viewed concurrently with a television program.

The 3D aspects of the EPG are schematically shown in FIG. 6. Referring to FIG. 6, screen 102 is displaying a television program, but window 103 within screen 102 displays the EPG information. Since the EPG information is confined to window 103, it is somewhat shrunk. The image of the various icons and pictograms of the EPG are generated using a 3D graphics accelerator, and are displayed as if a virtual viewer were watching these icons and pictograms from a particular distance. A viewer can "zoom" toward the pictograms to get a closer view of them by adjusting an appropriate control element on remote controller 150 (e.g. a touch pad, mouse, joystick, track ball, etc.). In this way, the user can take a closer look at the pictograms.

Also, since the images of the pictogram objects are generated from a computer model such that each object is at different virtual location in space, a viewer may "fly" his virtual camera position close up to an object, and thus be able to see more details.

As can be seen in FIG. 6, image 121 is roughly a virtual distance D1 from the planar background portion 155 of the EPG. Text blocks 110 and 111 are a virtual distance D2 from planar background portion 155 of the EPG, whereas baseball 121a and bat 121 are a virtual distance D2 from planar background portion 155. By manipulating the position of the virtual viewer, located at point P, the virtual viewer can "fly" or "zoom in" on the various portions of the EPG, e.g. by moving the location of the virtual viewer to a point P'. (Of course, the actual viewer doesn't need to move. Rather, the graphics accelerator within television system 100 reconstructs the EPG image on screen 102 as that image would be seen by a virtual observer moving from point P to P'.)

Figure 6A:
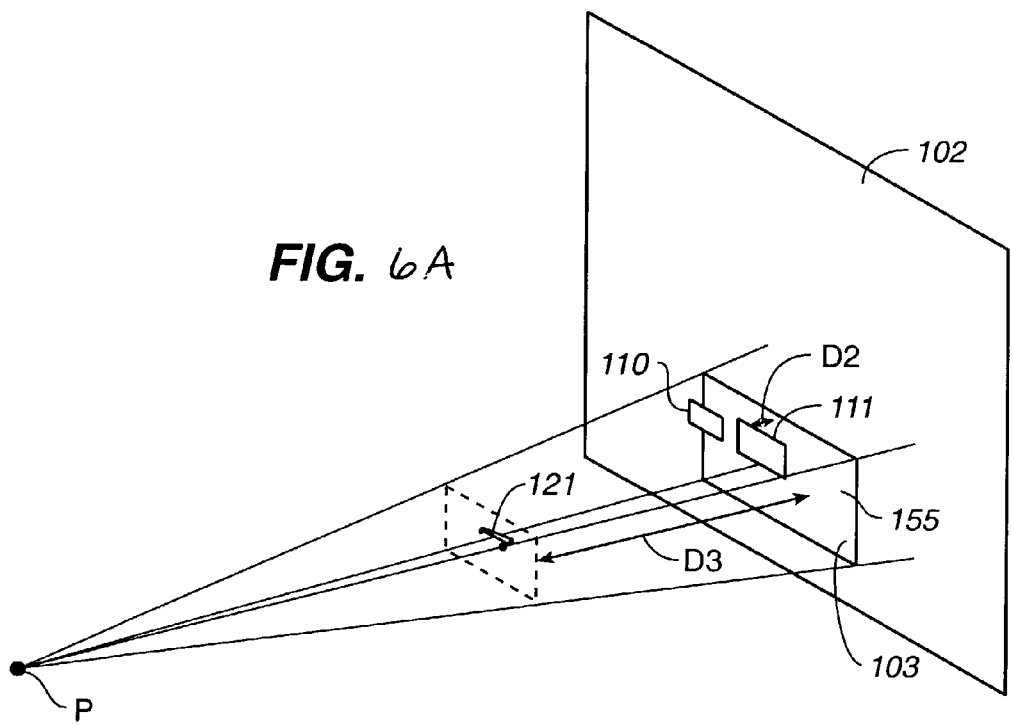
FIG. 6A illustrates an EPG in which the location of a virtual object within the EPG has been moved to a location closer to a virtual viewer.

In one embodiment, in lieu of, or in addition to moving the position of virtual viewer P, one can also move the location of the objects displayed in the EPG. For example, in one embodiment, a user can click on object 121 (the baseball bat). The EPG can respond by reconstructing the image of the baseball bat on a geometric surface located a distance D3 from plane 155 (FIG. 6A). This creates the visual impression of having the baseball bat 121 move closer to the television viewer so he has a better view of what he has just clicked on and selected. The viewer can then confirm his selection by clicking, once again, on baseball bat 121.

Just as the location of pictograms can be changed by clicking on them, the location in virtual 3D space of text blocks can also be changed in the same manner. (As mentioned above, the text blocks are can be mapped onto geometric surfaces in the same manner as the various pictograms.)

Referring back to FIG. 5, in one embodiment, the polygon mesh in the shape of the baseball and bat can be a two-dimensional polygon mesh. In other words, all of the polygon vertices are coplanar (i.e. the polygon mesh is flat) and all of the vertices have the same z dimension. The mesh has the outline of a baseball and bat when viewed from a direction perpendicular to the plane of the mesh. (When the vertices have the same z dimension, all of the vertices are the same distance from a virtual plane 155. Virtual plane 155 is the plane of the EPG background.) Arranging the polygon vertices so that they are all coplanar has the advantage that any text mapped onto the polygons using the 3D accelerator (e.g. the letters "MLB™" in FIG. 3) is easily read. However, in another embodiment, the polygons are not all coplanar, and in fact, can actually be a 3 dimensional model of a baseball and bat. On other words, the polygons are not flat in this other embodiment. The polygons collectively form the shape of a baseball and bat in three dimensions. (The ball is spherical and the bat is roughly cylindrical.) In this embodiment, the polygon vertices have different z values.

Help Mode

An EPG in accordance with one embodiment of the invention can include several features that enhance user friendliness. For example, in one embodiment, the EPG provides an indication of which buttons on the remote controller can be actuated in a given situation. In another embodiment, the remote controller contains a light emitting diode (LED) or other indicator, and if a user presses an inappropriate button on the remote controller, the LED illuminates, thereby informing the user that he or she is doing something improper. (In this embodiment, the CPU within video system 100 typically sends a signal to remote controller 150. Alternatively, in this embodiment, a microprocessor within the controller itself determines when an inappropriate button is being pressed.)

In another embodiment, the various control buttons of the remote controller contain or are associated with LEDs or other indicators (e.g. liquid crystal displays (LCDs) in conjunction with a touch screen etc.). The LEDs corresponding to those buttons that can be pressed in a given situation illuminate, thereby informing the viewer which buttons he or she can press in a given situation.

In another embodiment, the EPG may include a window on screen 102 (not shown) that indicates to the user which buttons would be appropriate to actuate in a certain situation.

In another embodiment, the EPG displays user assistance information on screen 102 if the user tries to actuate an inappropriate button on remote controller 150.

In another embodiment, the remote controller contains a "help" key. If the user presses the help key, screen 102 provides a window 230 showing an image 232 of remote controller 150, and indicating which keys can be pressed in a given situation (FIG. 3D). (The keys that can be pushed, e.g. keys 234, 236 and 238) are highlighted.

By indicating to the user which keys can be pressed in a given situation, user friendliness of an EPG in accordance with the invention is enhanced.

In one embodiment, the EPG provides automated assistance to a user. This can be provided in several ways. For example, as mentioned above, the EPG can indicate to the user which remote control keys can be used in a situation. Additional information on their respective functions may also be provided. In another embodiment, the EPG includes a question mark icon 240 (FIGS. 3A and 3D). The user can click on this icon, to obtain help information. Alternatively, the user can click on question mark icon 240 and drag it to a pictogram on screen 102 to obtain information about what that pictogram does.

In one embodiment, one of the buttons on remote controller 150 is a "help" button that causes the EPG to depict on screen 102 a help menu. The EPG may suggest various "help" options by highlighting appropriate options to better guide the user.

Description of the Hardware Within the STB

Figure 7:
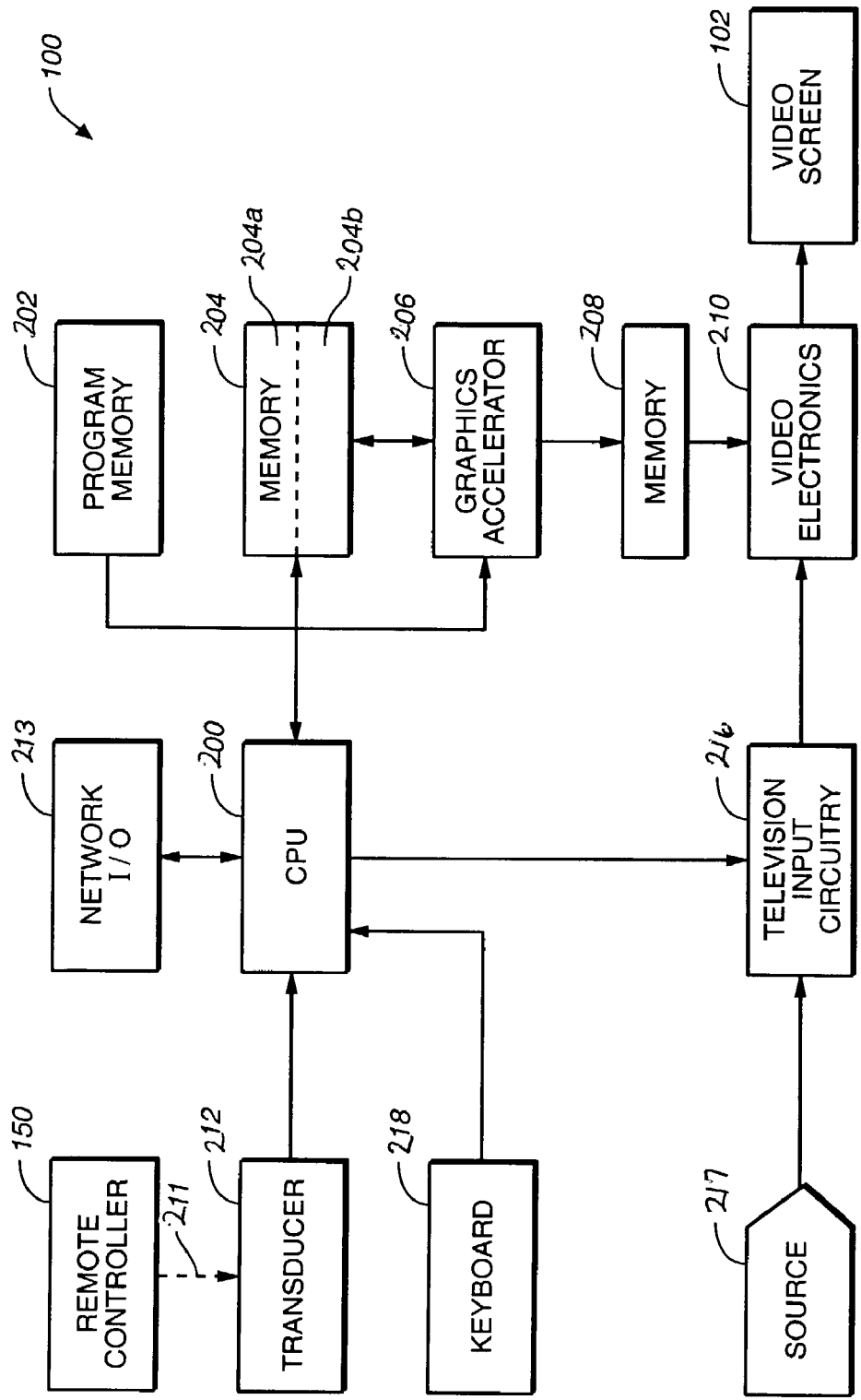
FIG. 7 is a block diagram of a television system in accordance with present invention.

FIG. 7, shows one embodiment of hardware used by the receiver to practice the invention typically comprises a) a CPU 200 (e.g. a CELERON™ or, PENTIUM™ manufactured by INTEL™ Corporation, or any other equivalent CPU) coupled to a) a program memory 202 (typically a ROM, EPROM, EEPROM, EAROM, hard disk, CD ROM, or other memory device); b) a second memory device 204 (e.g. a RAM or magnetic disk); and c) a graphics accelerator circuit 206. Program memory 202 contains the program instructions executed by CPU 200. Memory 204 can comprise one or more memory devices. In one embodiment, memory 204 contains a) a portion 204a containing information concerning the polygons used to construct images of objects; and b) a portion 204b containing pixel information to be applied, or bound, to the polygons. Graphics accelerator 206 accesses the information contained in memory 204 and constructs an image in a pixel array memory 208. Information from pixel array memory 208 is provided to video electronics circuit 210 for display on video display screen 102.

Also shown in FIG. 7 is remote control device 150, which is manipulated by a user as described above. Remote control device 150 provides signals (typically communicated via infra red communication (or any other method as previously described) shown as dotted line arrow 211) to a transducer 212 that is coupled to CPU 200. CPU 200 reads the signals provided by remote control device 150, and controls the images displayed on video screen 102 in response thereto. Also, many small differences can be made in the "architecture" of connecting the remote control base unit (e.g. the transceiver that receives signals from remote controller 150). In some cases this architecture may mimic a parallel or serial port, and in other cases it may mimic a mouse and or a keyboard. This is advantageous, since it allows remote controller 150 to send commands directly to system 100, without requiring special driver software.

Also shown in FIG. 7 is a network I/O circuit 213. Network I/O circuit 213 can be any of numerous different types of circuits, e.g. a modem for communicating with the internet, or an interface circuit for communicating with other LAN or WAN networks. As mentioned above, by clicking on icon or pictogram 122, a user can obtain data concerning items that can be purchased from different vendors. In one embodiment, when a user clicks on one of these icons, a signal is communicated to a server coupled to the LAN or WAN network, and that server communicates via network circuit 213 back to CPU 200 information to be displayed on screen 102 concerning merchandise that can be ordered from that vendor. This information can be in the form of a web page, for example. Network circuit 213 can also be used to order pay-per-view items via a LAN or WAN.

Also shown in FIG. 7 is a television input circuit 216. Circuit 216 receives a video signal from a source 217, e.g. a television antenna, an electrical or optical cable system, a satellite system, or any other appropriate video signal source. This signal is communicated to video electronics 210 for display on screen 102.

In one embodiment, the EPG can receive information and commands by a keyboard 218 that is electrically coupled to CPU 200. Keyboard 218 can be an alphanumeric keyboard, e.g. a qwerty keyboard. However, other types of keyboards can be used in conjunction with the EPG. Keyboard 218 provides additional flexibility for a user controlling the EPG.

Other Programmable Options

In one embodiment, the EPG can be programmed to provide to the user a reminder when certain programs of interest are going to be on. This can be accomplished using remote controller 150, clicking on a selected program pictogram, and pressing a control button on the remote controller that instructs CPU 200 to display a prompt on screen 102 shortly before that program is to be broadcast. Alternatively, remote controller 150 can have a numeric keyboard or a more complicated input control console for purposes of entering such information into the EPG. Alternatively, keyboard 218 can be used to enter this information.

In one embodiment, a user can modify the format in which the EPG information is to be displayed. For example, the user can adjust the size of the text (e.g. the font size) of the information displayed by the EPG. Thus, viewers with poor vision will be better able to read the information displayed by the EPG. Viewers with good vision can shrink the text size so that more information can be displayed on the screen by the EPG. This can be accomplished by using remote controller 150 to cause CPU 200 to display an appropriate menu of control options on screen 102. The user can then click on the displayed options to enter a text font size into the EPG. (The text font size is typically stored within a memory in the EPG, e.g. within memory 204.) Rather than clicking on text font size options, text font size information can be entered into the EPG using keyboard 218.

There is a number of ways one can enter mode information into the EPG. For example, remote controller 150 can have a mode button. When the mode button is pressed, a list of programmable menu options appears on screen 102, and the user can click on a desired option. Alternatively, the EPG can have a menu icon, and the user can click on the menu icon. Alternatively, there can be a menu button on video system 100 itself that a user can push. Other techniques can be used to communicate programmable option choices to the EPG.

EPG With Reduced Size Program Displays

In another embodiment, portions of the EPG can be used to display reduced size (for example, thumbnail) versions of programs appearing on various channels, thereby permitting a viewer to preview programs. For example, optionally, a portion 220 of screen 102 (FIG. 3C) can depict a thumbnail display of what is playing on one of the channels. In another embodiment, portion 220 of screen 102 can depict a set of reduced size displays (e.g. in portions 220a, 220b, and 220c of portion 220 of screen 102) so that a viewer can see what is showing on different channels. In an alternative embodiment, the reduced size displays can be mapped into geometric surfaces, e.g. of a polyhedron (e.g. a cube) as described in U.S. patent application Ser. No. 09/378,184, filed Aug. 20, 1999 by Kamen et al., and U.S. patent application Ser. No. 09/378,220, filed Aug. 20, 1999 by Kamen et al. The '184 and '220 applications are incorporated herein by reference.

The '184 and '220 applications teach mapping (or binding) video images onto geometric surfaces using 3D accelerator technology. A 3D graphics accelerator generates a pixel array corresponding to these images as bound onto the geometric surfaces. By altering the position of a "virtual viewer", or by altering the shape or angle of the geometric surface, one can create an appearance similar to projecting a movie onto a surface having a particular shape, or held at a particular angle. The '184 and '220 applications teach, among other things, that one can display a polyhedron (e.g. a cube), with different video images appearing on the various faces of the cube. One can alter the orientation of the polyhedron using the remote controller so that different polyhedron faces are exposed. In one embodiment of the invention, programs from different channels are mapped onto different faces of a polyhedron (e.g. faces 250, 251 and 252 of an octahedron 253 in FIG. 3. C'). A viewer can rotate octahedron 253 to obtain a thumbnail display of what is playing on the various channels. (For such an embodiment, it is typically desirable to include a video capture card within system 100 for downloading the video signals into a pixel memory so that graphics accelerator 206 can map these pixels onto the various geometric surfaces of octahedron 253.)

The location and angle of the geometric surface upon which video clips are mapped can be modified by the EPG. For example, by clicking on a reduced size video image, the user can cause the EPG to move the image closer to the virtual viewer (i.e. enlarge the portion of the screen showing the video image.)

EPG Operating as Shell or Window for Other Applications

In one embodiment, the EPG system provides a reliable and efficient method of updating or replacing the application software that implements the electronic guide at the user sites. This can be accomplished by downloading such software either from the cable broadcaster (e.g. from source 217 using input circuitry 216), or via a WAN or LAN, e.g. using network I/O circuit 213 (FIG. 7). The EPG software can be designed in modules. For example, one module is optionally a graphics user interface (GUI) module, whereas another module can handle the different display icons. Another module can handle 3D graphics generation, and another module can be a master program module. These modules can be downloaded into program memory 202. EPG updates can be provided either automatically or in response to a prompt from the user using remote controller 150.

In an embodiment which permits the automated updating of software, the program memory 202 should contain a programmable segment (e.g. a RAM, EEPROM, EAROM, magnetic memory or magneto-optic memory) to accommodate the loading of data.

In one embodiment, the EPG operates as a shell or window to enable a user to access other applications or information systems that are not part of the EPG application or data. For example, in one embodiment, when using the EPG, one can press a button on the remote controller, or click on an icon within the EPG to activate Internet server software (e.g. NETSCAPE™ software, INTERNET EXPLORER™ software, or other web surfing software package). (Such software can be stored within program memory 202.) In this embodiment, the information provided by the web and the web surfing software package is bound to a flat geometric surface and displayed on screen 102. The viewer can then use the screen to browse the Internet as if he or she were logged onto a PC. (In such an embodiment, it is typically desirable to couple alphanumeric keyboard 218 or other alphanumeric input device to video system 100 so that the user can enter key words for searching or type URLs into system 100. In this embodiment, system 100 communicates with a proxy server or other ISP via network I/O circuit 213 (FIG. 7).

The options and features described above can be combined to provide a 3D enhanced EPG that allows user friendliness and interactivity not known in current EPG systems. However, these options and features can be practiced independently. Further, different combinations of these options and features can be practiced in an EPG.

While the invention has been described with respect to specific embodiments, those skilled in the art will appreciate that changes can be made in form and detail without departing from the spirit and scope of the invention. For example, an EPG in accordance with the present invention can be displayed on CRT, LCD, projection, or other types of display systems. The EPG can be displayed on a television, personal computer, or a device that is a combination television/personal computer. The EPG can be used in conjunction with video signals that are provided by electrical or optical cable, radio wave broadcast, satellite broadcast, or other types of video signal transmission. The information displayed in the EPG can originate from any of numerous sources, e.g. provided via electrical or optical cable, radio waves, satellite broadcast, or a wide area network (for example, the Internet).

When displaying video information, the video information can be applied to a geometric surface using a 3D graphics pipeline. Thus, as shown in FIG. 3B, both the EPG in portion 103*a* of screen 102 and the television program in portion 103*b* can be bound to geometric surfaces and displayed using a 3D graphics pipeline. (In fact, in one embodiment, when watching the television program without the EPG, the television program can be bound to a geometric surface and displayed as described above.)

As explained in the above-incorporated '442 application, the 3D graphics pipeline can be implemented by a combination of hardware elements, known as accelerators, and software, some of which is referred to as drivers. The partitioning between hardware and software may vary. Accordingly, all of these modifications come within the present invention.

Figure 8:
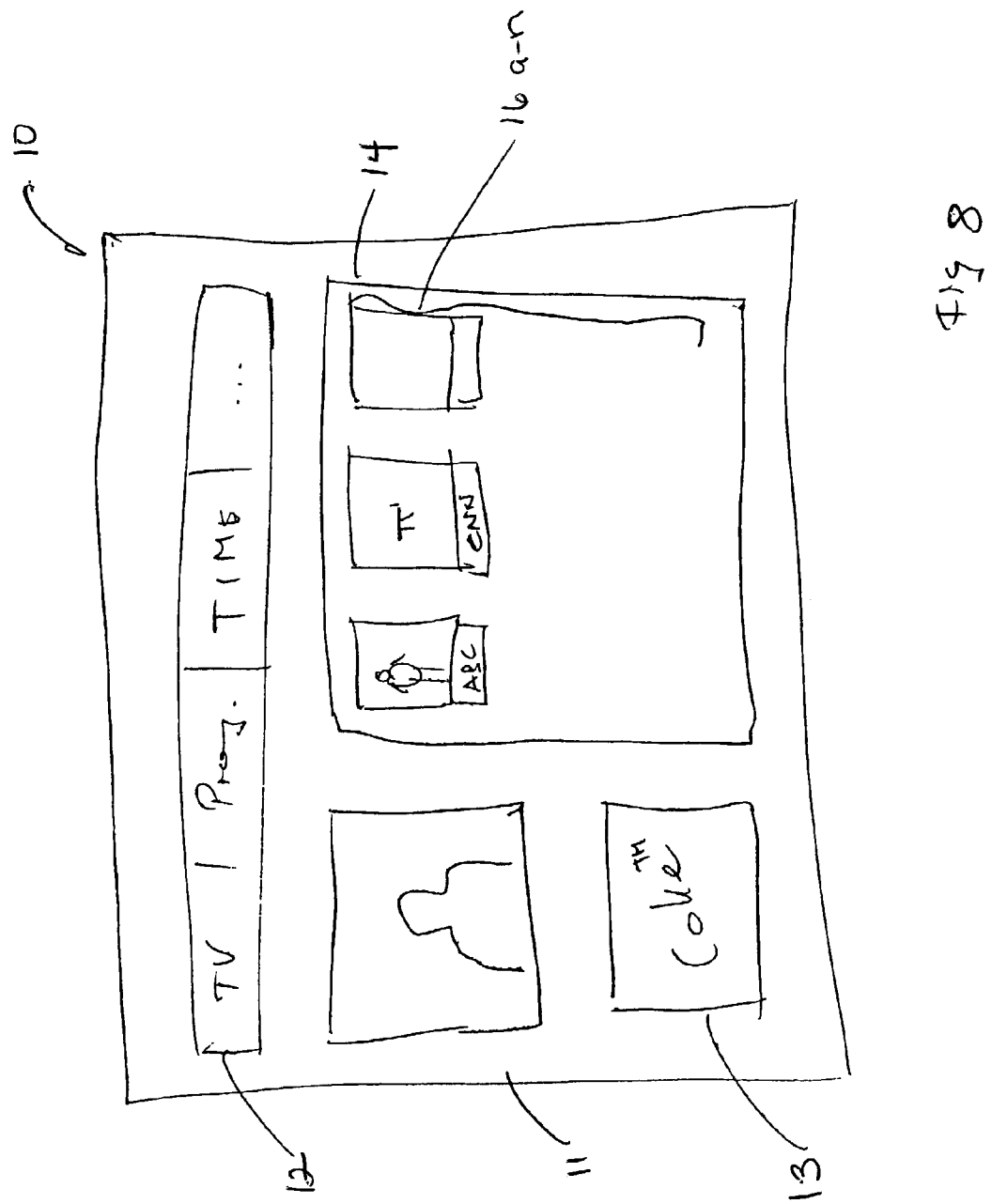
FIG. 8 shows another embodiment of an EPG in accordance with the invention.

FIG. 8 shows an embodiment according to the presently disclosed art. Window or screen section 14 still contains elements regarding the channels selected for inclusion in the EPG; however, instead of text lines or image-enhanced text lines, a thumbnail video now represents each selected channel.

Depending on the number of tuners available for the set-top box, the image area assigned to each channel within window 14 may only show snapshots of programming on each channel, with each snapshot updated at brief intervals of, for example, a few seconds. Alternatively, in some cases the image areas assigned to the channels within window 14 may show multiple live video streams.

In one embodiment, for example, a combination of hundreds of small thumbnail videos can be streamed over a separate preview channel that contains nothing but thumbnail video streams. These streams may have extremely high compression, because their resolution is very low, for example, only 20 by 16 pixels for each image.

In some embodiments a single tuner that is, for example, enhanced with scene detection capabilities, may sequentially tune through the list of selected programs. Then rather than simply grab whatever video stream it can tune, such an enhanced tuner may wait for a new scene, grab that scene, and then store that scene for the image area 16 *a-n* window 14 assigned to that specific channel. The tuner may then repeat through the list as often as necessary, until the viewer makes a selection. In addition, image areas 16 *a-n* may contain additional text information, such as the channel number, program name, time, etc.

Figure 9:
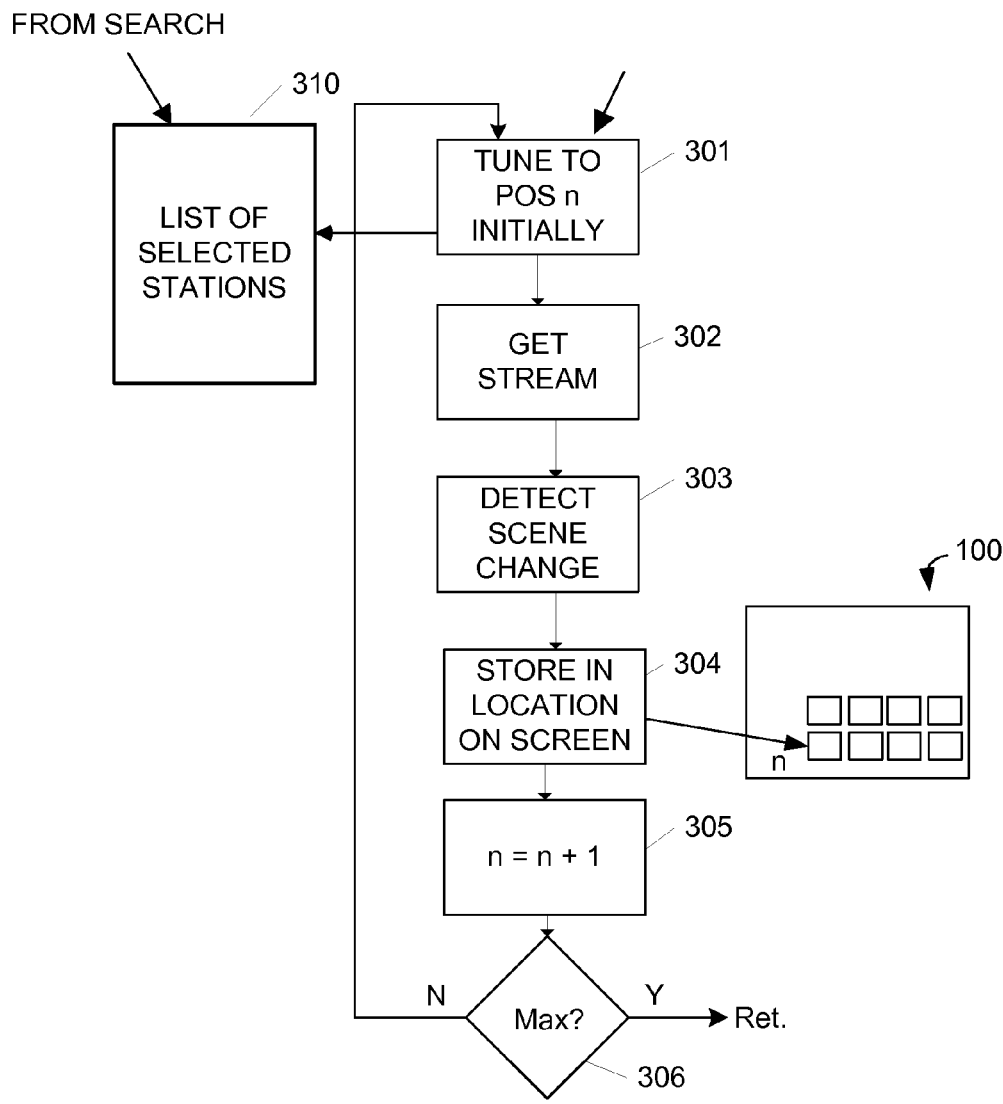
FIG. 9 shows a simplified flow diagram of operations performed by a television receiver comprising a single tuner.

FIG. 9 shows a simplified flow diagram for such a single-tuner embodiment, where one tuner would be used to sequentially grab new scenes from each video stream and store them in an image area 16 *a-n*. Such a system would typically result in an update of, for example, approximately every few seconds per channel, depending on the number of locations 16 *a-n* displayed (e.g., 8, 12, 16, etc,).

In step 301, the tuner is tuned to the first channel on a list of selected channels 310 provided by the EPG search program. In step 302, the video stream is decoded, by a method that depends on whether the video is analog or digital, until a steady stream is available. In step 303, the video stream runs until a scene change occurs, at which point a shutter function, triggered by the scene change, captures the new scene. Step 304 takes that new scene and puts it onto video screen 100 in the image area assigned to the element n.

Step 305 increments to the next n and step 306 looks to see whether the maximum n has been achieved or not. In case the maximum n has not been achieved, the process begins again. In case the maximum n has been achieved, the updating finishes and the software checks whether the viewer has made a selection, or whether to start over again.

Some cases may require an additional step that generates an improved image by the following process:

1. Out of a selection of n images, the process seeks the "most presentable" image. The criteria for determining "most presentable" may vary. In one embodiment, the criterion may be the image with the best contrast; in some other embodiment the median brightness image may be the best. Other parameters for best image may include most color, etc.

2. Upon selecting the "most presentable" image, a new "filtered" image is generated, which can represent the program on the selected channel in the best manner. Filters may include, for example, storing in black and white format, enhanced or reduced contrast, enhanced or reduced color saturation, etc.

Figure 10:
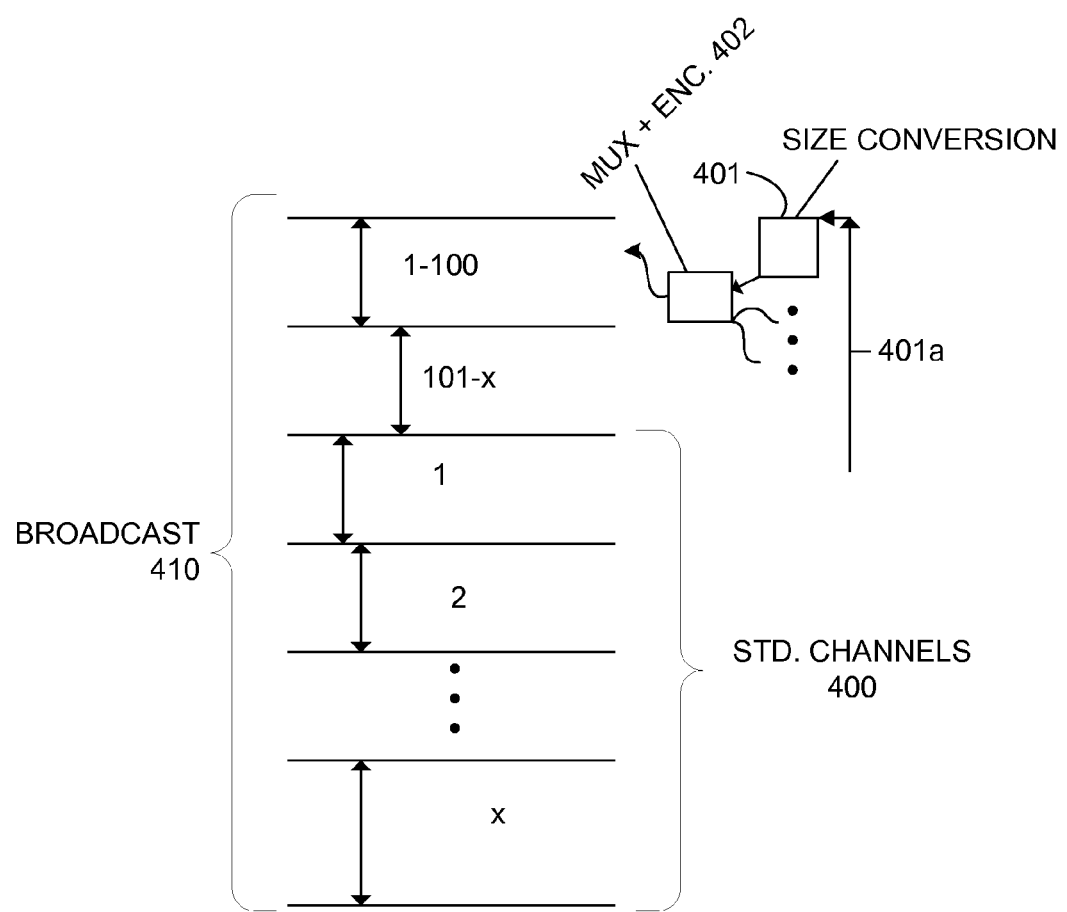
FIG. 10 illustrates how a set of standard channels may be converted to thumbnail video streams.

FIG. 10 shows how a set of standard channels 400 ranging from 1 to x could be converted to thumbnail video streams. A size conversion function 401 receives the video stream of each channel via a link 401*a* (this stream could be, for example, an analog video or an MPEG). For a standard broadcast TV, for example, the approximate video resolution is 600×400 pixels. This stream could be converted down to 20×16 pixels for example, or a similar small, suitable size by converter 401 (only one instance shown), and then further processed with an encoding and multiplexer element 402 (only one instance shown) and then fed into a separate stream 1-100, respectively 101-*x*. In this example each of those streams would contain live thumbnail images for up to 100 channels. The advantage of using this approach is that with a single tuner up to 100 channels can be shown simultaneously, by software on the receiving side decoding the correct thumbnail streams and selecting them accordingly (not shown). This might be done using dedicated hardware or software well known in the art running on a CPU in the set top box, for example.

Elements 401 and 402 typically would be implemented in software using a head-end based server, and then those signals would be broadcast along with the regular channels as shown in broadcast channel 410.

Figure 11:
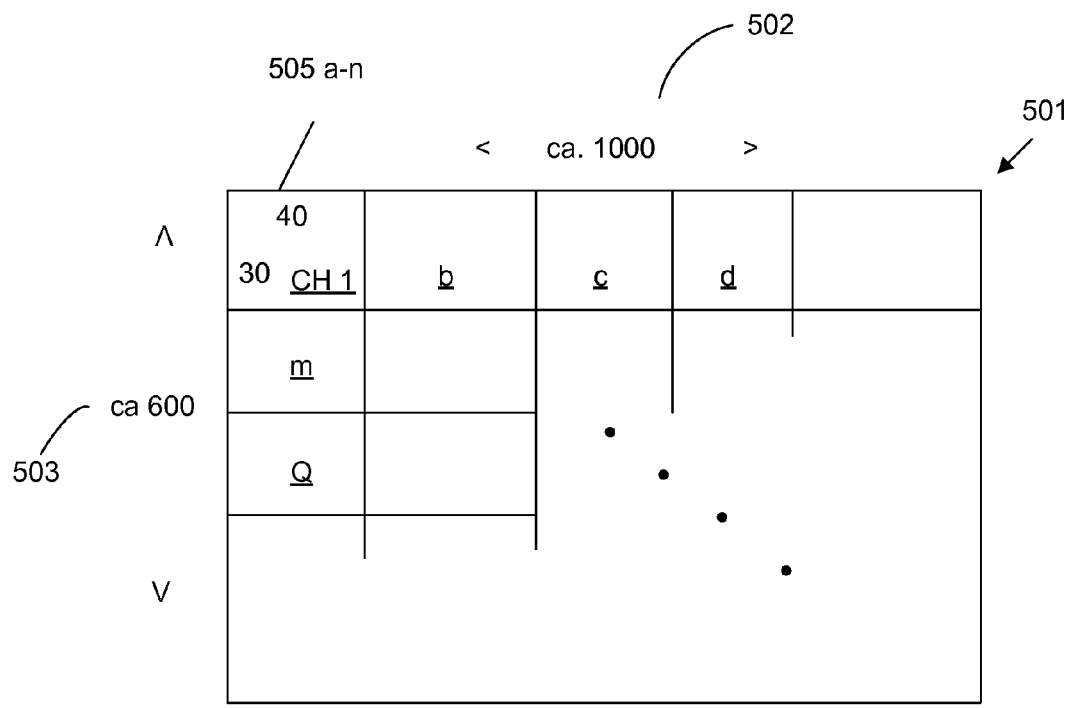
FIG. 11 shows one example of an MPEG video stream format in accordance with the present invention.

FIG. 11 shows an approach using the novel art of this disclosure. An MPEG stream 501 has a format of, in this case for example, a width 502 of 1000 pixels horizontally and a height 503 of 600 pixels vertically. These dimensions are roughly the size of an HDTV video stream, such as is fully supported by MPEG2 standards today.

However, rather than comprising one HDTV stream, stream 501 comprises a multitude of little streams, or minipictures, 505 *a-n*, each having an aspect ratio of 30 pixels vertically and 40 pixels horizontally. Further, streams 505 *a-n* are bundled together.

In this example in FIG. 11, with 40 horizontal pixels per minipicture and 1000 pixels in the total frame, there are 25 horizontal streams. And with 30 vertical pixels and 600 pixels in the frame, there are 20 vertical streams. Thus 25 horizontal streams times 20 vertical streams results, in this example, in a total of 500 thumbnail-sized streams that may be transmitted in one MPEG PID. Thus the novel art of this disclosure allows, in this example, very efficient delivery of up to 500 video streams in thumbnail size to the STB.

Figure 12:
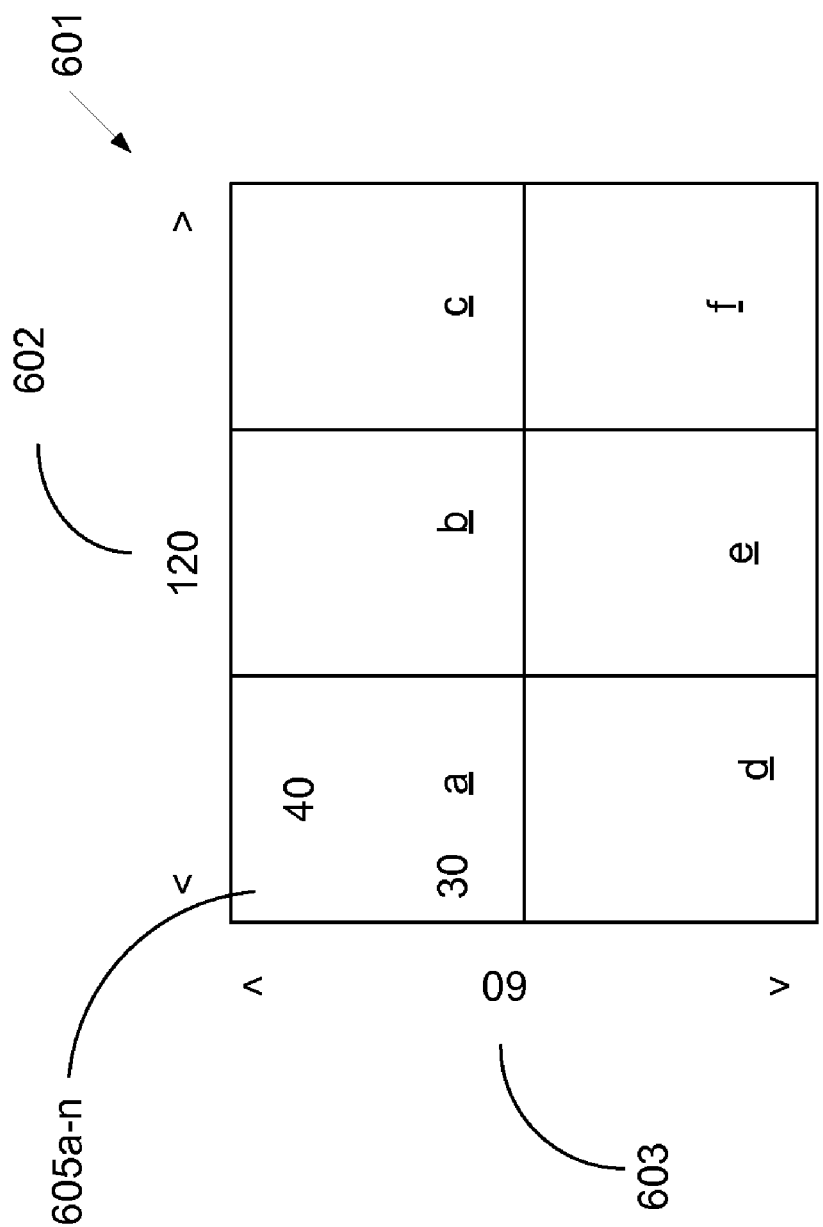
FIG. 12 shows another embodiment of an MPEG video stream format in accordance with the invention.

FIG. 12 shows an alternative method that is a compromise between reduced size and an adequate number of preview thumbnails. This method has, for example, only six thumbnails prepackaged in a stream 601 that has a frame resolution width 602 of 120 pixels and height 603 of 60 pixels. Such a stream would contain only six thumbnail frames 605 *a, b, c, d, e,* and *f*; and each thumbnail frame would have, again, an aspect ratio of 30 by 40 each, which would allows three frames across and two frames vertically.

It is clear to a person skilled in the art that many different arrangements of thumbnail streams are possible, and, further, instead of dimensions of 30×40 pixels, other pixel dimensions may be used. In some cases, for example, a letterbox ratio (e.g., 9:16) may be used instead of a ratio of 3:4, and different numbers of streams may be combined. These are only typical examples of the many possible arrangements and combinations.

Figure 13:
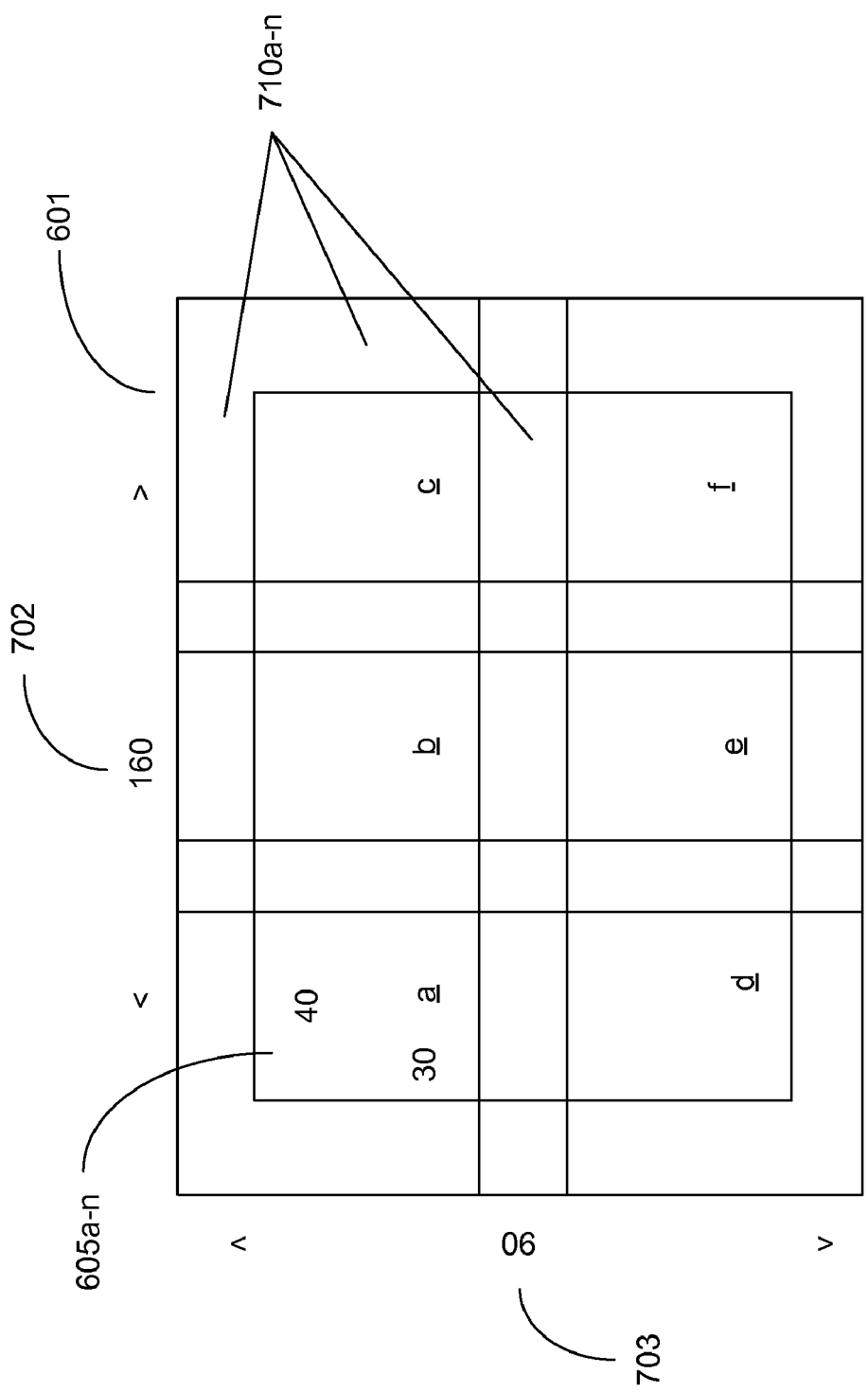
FIG. 13 shows a set of thumbnail frames similar to those of FIG. 12 wherein the streams are separated by a frame.

FIG. 13 shows a set of thumbnail frames similar to FIG. 12; however, the streams are now separated by a frame 710, which contains frame elements 710 *a-n* that offer a 10-pixel-wide border both horizontally and vertically. Such a frame overlaid on the stream gives a visual impression of a packaging of separate video elements, rather than a presentation of a single stream with six integrated video streams.

Figure 14:
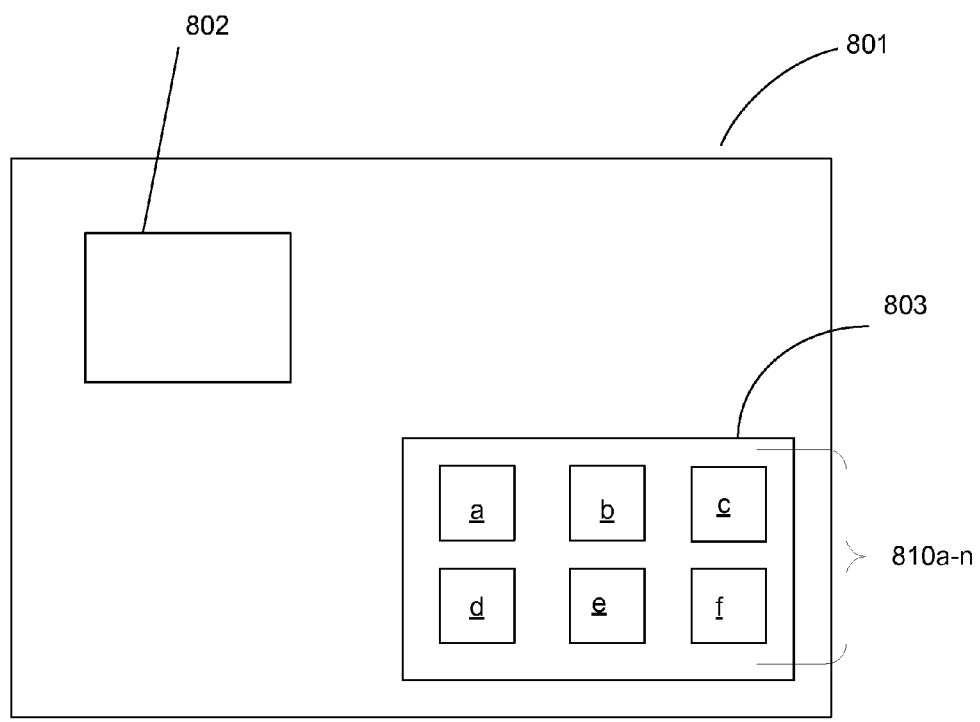
FIG. 14 shows how a stream as shown in FIG. 13 may be presented on a screen.

FIG. 14 shows how such a stream as shown in FIG. 13 might be presented on a screen 801. For example, block 802 is the program currently tuned on the main screen display; and block 803 is a preview mosaic consisting of elements 810 *a-f,* or more generically, a-n, depending on the configuration of the system.

The spacing of previous FIG. 710 *a-n* can now be used to fill in a pattern inside block 803, or to create a highlight frame, etc.

Figure 15:
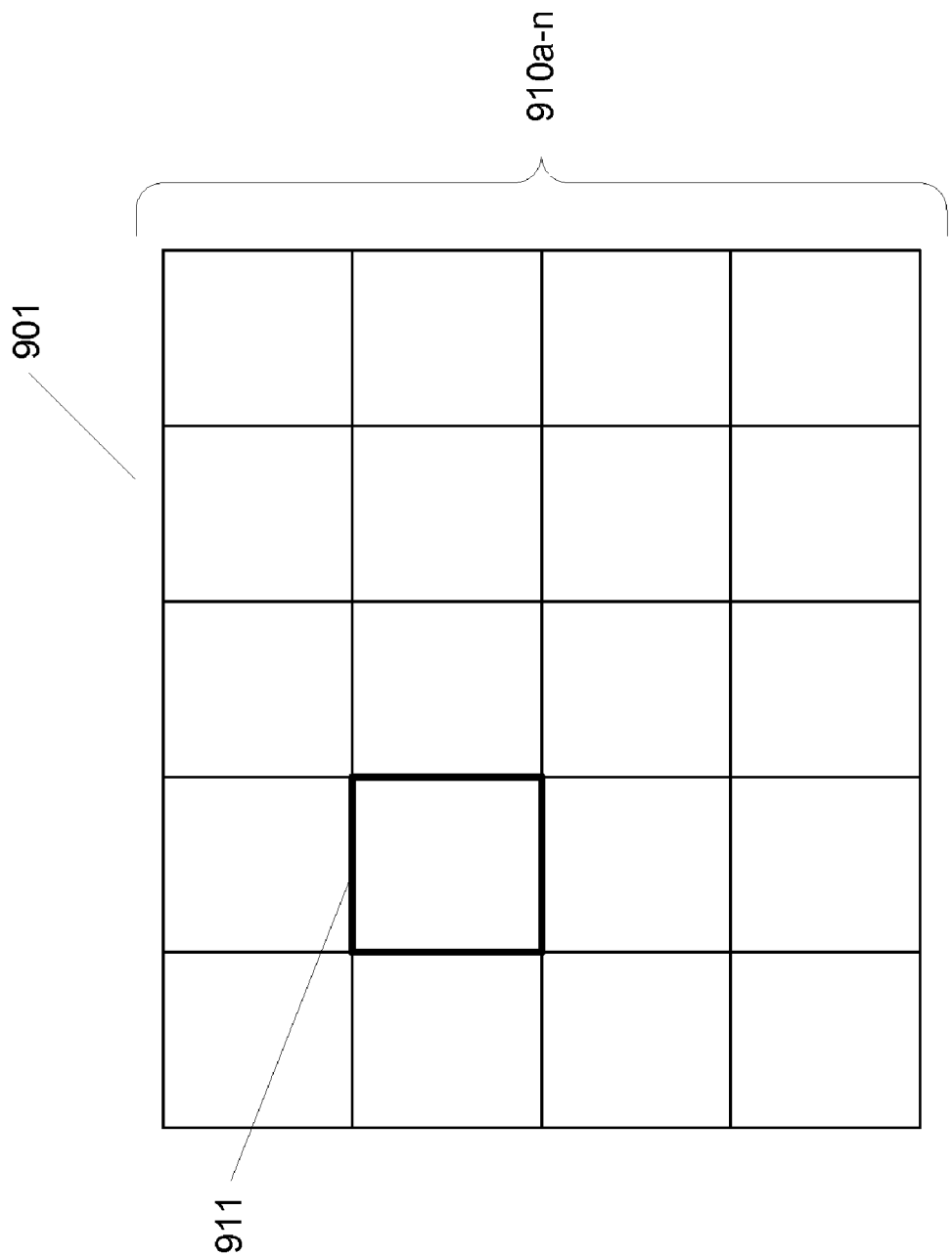
FIG. 15 shows another embodiment of a screen showing a high density of different channels.

FIG. 15 shows yet another screen shot, this time of stream 901, showing a high density of 20 different channels 910 *a-n*. One channel, 911, is highlighted with a frame. This case could be for visual surfing, when people want to review a lot of channels. In such a case, people can see all their favorite channels on one single screen shot, navigate the selection frame, and select the preferred channel.

Figure 16:
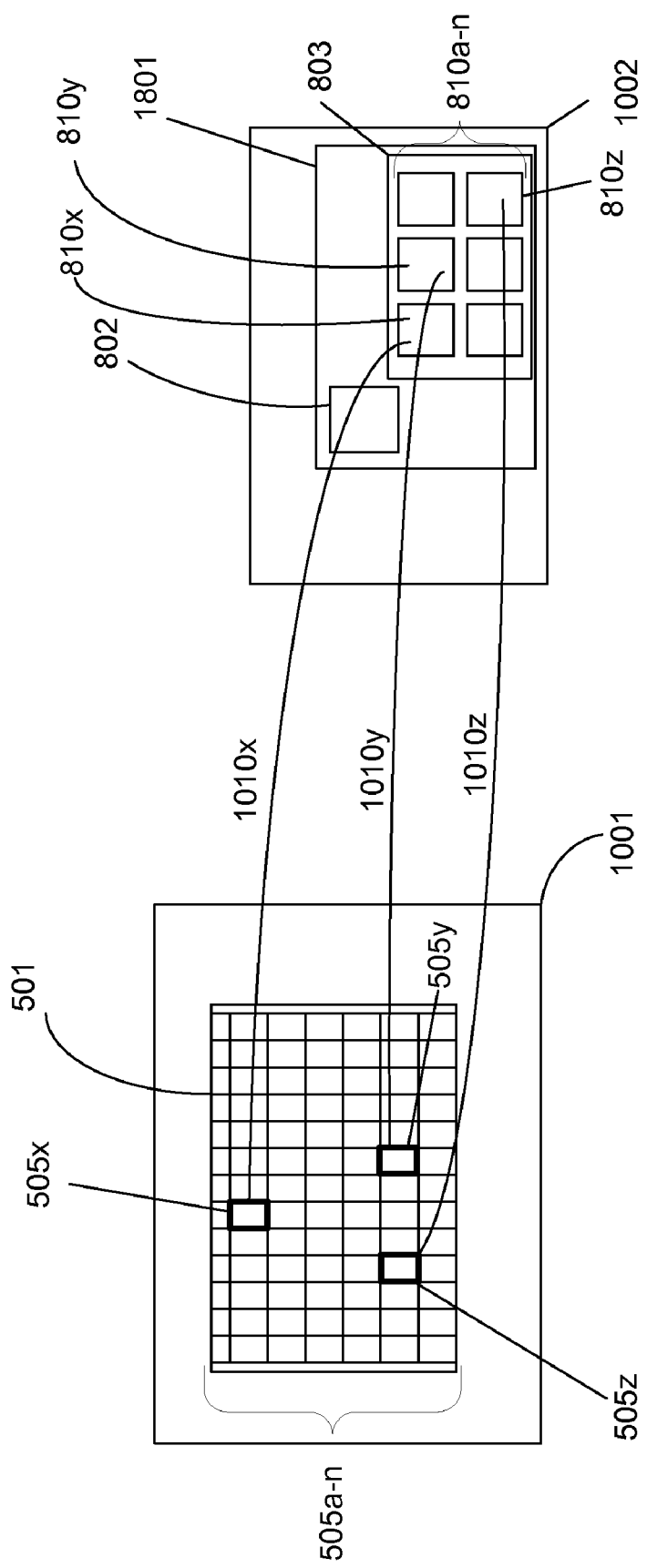
FIG. 16 illustrates how the mapping of the present invention may be performed in accordance with one embodiment.

FIG. 16 shows how the mapping of the novel art of this disclosure may be done. A stream such as stream 501 (discussed earlier) is written into texture map 1001, as discussed earlier (disclosure of case 012). Then selected areas, containing in this example the video frames 505*x*, 505*y*, and 505*z*, are transposed into a frame buffer 1801, which is in the output video memory 1002. Those transpositions are performed by links 1010*x*, 1010*y*, and 1010*z*, and paint those video streams into the windows 810*x*, 810*y*, and 810*z*. As a result, there is a continuous video stream and the selection block 803 presents selected thumbnail frames out of the stream 501. There is no need for any specific relational allocation between the location of those sources in main stream 501 and their location in the presentation buffer 803.

The links 1010*x*, 1010*y*, and 1010*z* are performed as described earlier as binding of texture map onto objects, which are elements of 810 *a-n* in this example. Obviously, other arrangements may be chosen, such as cubes, pyramids, spheres, etc. Only the fantasy of the designer sets the limits.

The actual correlation of which thumbnails are displayed where can be done again in many ways, by using search algorithms, favorite channels, and all kinds of other parameters that can be used to combine and present a selection, for example, by category, by movie time, etc.

Figure 17:
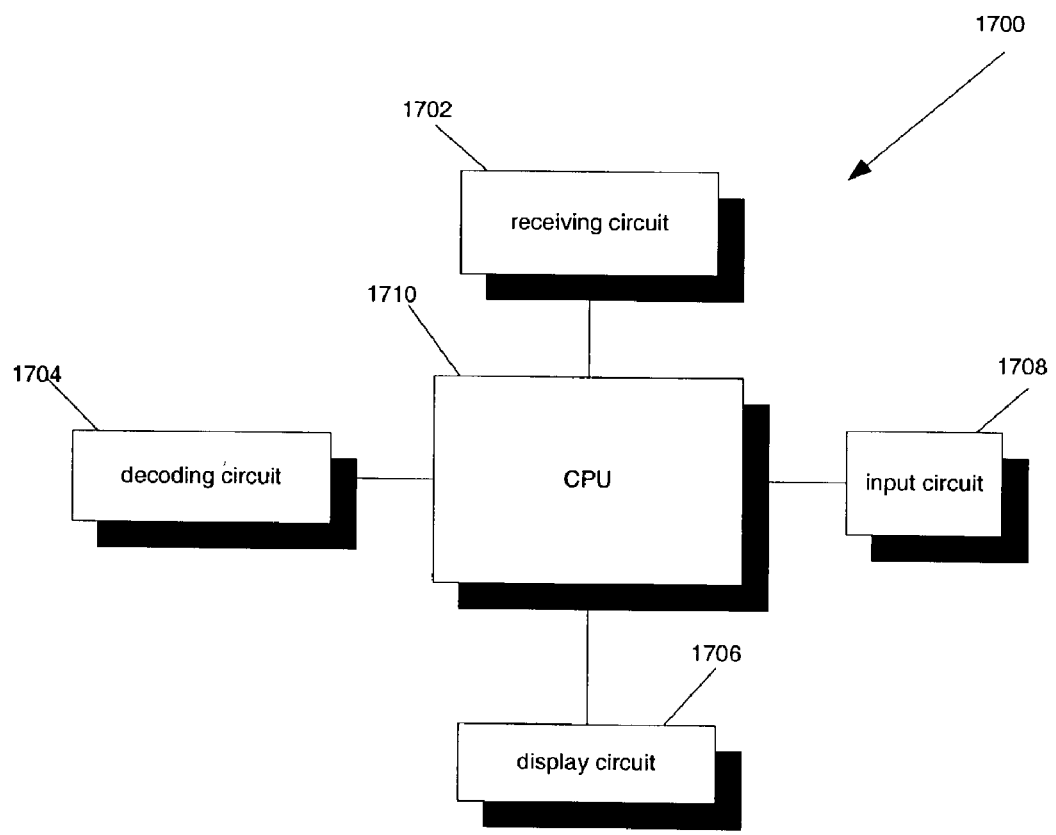
FIG. 17 shows a high level block diagram of hardware that may be used by a receiver in accordance with one embodiment of the invention.

FIG. 17 shows one embodiment of hardware 1700 of a receiver that may be used to practice aspects of the invention described with reference to FIGS. 9 to 16. Hardware 1700 includes receiving circuit 1702 to receive programming including EPG data that has been combined in the manner described with reference to FIGS. 9 to 16. A decoding circuit 1704 decodes the received programming and a display circuit 1706 displays the decoded EPG data as a display screen. User input selecting "channel" for textural mapping, etc. is received via an input circuit 1708. Each of the circuits are controlled by a CPU 1710. The design and integration of the circuits of hardware 1700 is well known and a skilled reader will recognize the components that form each of the circuits from FIG. 7. Thus, circuits 1702-1708 are not further described.

Figure 18:
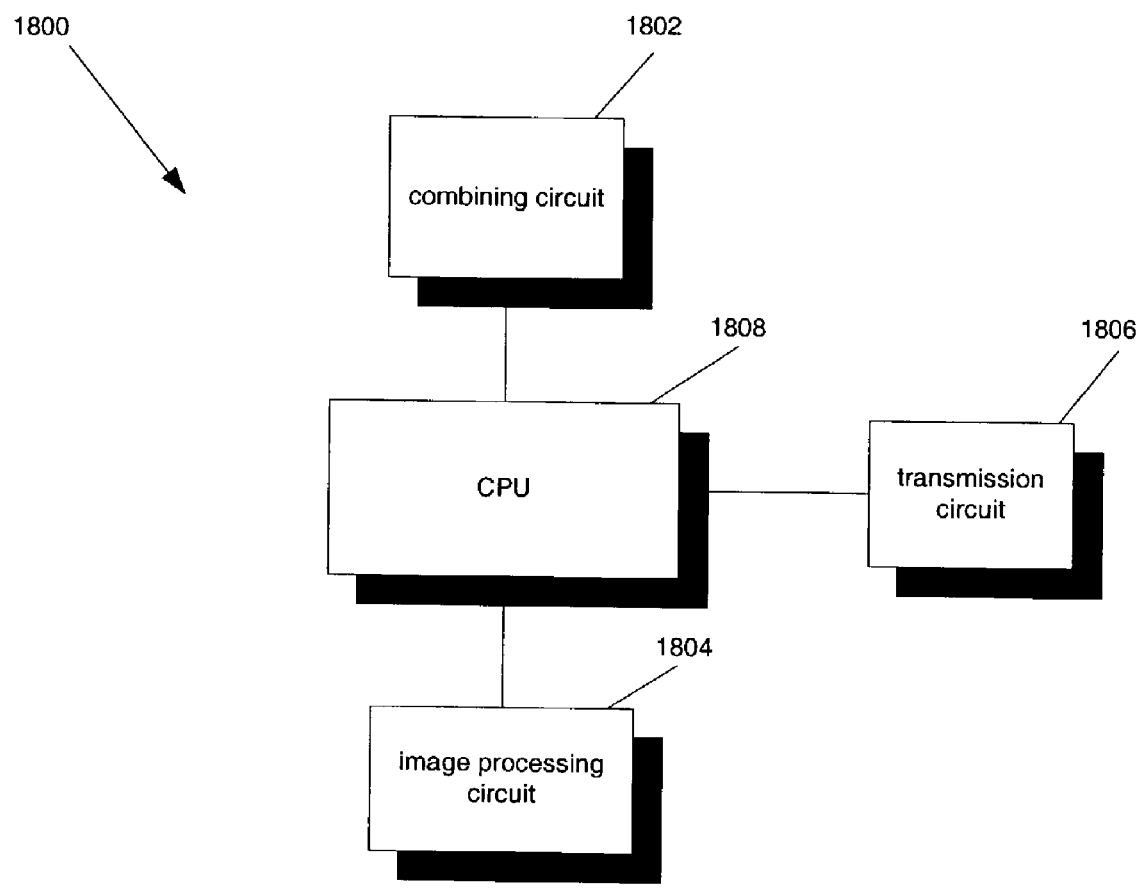
FIG. 18 shows a high level block diagram of hardware that may be used by a head-end system in accordance with one embodiment of the invention.

FIG. 18 shows a block diagram of hardware 1800 that may be used at a head end to package or combine EPG data in the manner described with reference to FIGS. 9 to 16. Hardware 1800 includes an image processing circuit 1802 which applies a size conversion function to the video stream of each channel. A combining circuit 1804 including an encoder and a multiplexor thereafter encodes and multiplexes the size converted or reduced streams into a single stream wherein the packets are identified by a single PID. A transmission circuit 1806 transmits the single stream to a plurality of receiver circuits 1802 to 1806 are controlled by a CPU 1808. The design and integration of circuits 1802 to 1806 is well known and is no further described.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
    combining a plurality of different input video streams into a single output video stream, such that the output video stream includes an electronic program guide configured to display a mosaic of a plurality of videos, each input video stream of the combined plurality of different input streams comprising a low resolution version of a high resolution video stream which is transmitted on a first channel, each of the videos are configured to be displayed immediately adjacent each other and the mosaic having no frame between the videos, each of the videos corresponding to each of the different input video streams of the plurality of input video streams; and transmitting the single output video stream to a plurality of receivers on a second channel simultaneously with the transmission of the high resolution video stream on the first channel, the second channel being different from the first channel.

2. The method of claim 1, further comprising generating each of the plurality of input video streams.

3. The method of claim 2, wherein generating each of the plurality of input video streams comprises applying a size conversion function to each of the plurality of video streams to be televised in order to reduce a resolution of a video image therein.

4. The method of claim 1, wherein combining the plurality of input video streams comprises encoding and multiplexing the plurality of input video streams into the single output video stream, the single output video stream comprising data packets identified by a unique packet identifier.

5. A method comprising:
receiving, on a first channel, an electronic program guide data stream comprising multiple video streams, each of the multiple video streams of the electronic program guide data stream corresponding to a different video image, which have been encoded and multiplexed for transmission on the first channel, each video stream of the electronic program guide data stream comprising a low resolution version of a high resolution video stream which is being simultaneously received on a second channel;

decoding the electronic program guide data stream into frames, each frame defining a mosaic-style image comprising video image areas for video images in the electronic program guide data stream corresponding to each different video image from each of the multiple video streams, the video image areas being immediately adjacent each other and the mosaic-style image having no frame between each video image area; and simultaneously displaying each of the frames including each of the different video images on a display screen coupled to a decoder.

6. The method of claim 5, wherein each frame is displayed on a portion of the display screen, the method further comprising displaying video images associated with a selected channel on a remainder of the display screen.

7. The method of claim 5, further comprising receiving user input to select a particular video image area within a frame for display; and selecting the particular video image area based on the user input.

8. The method of claim 7, further comprising highlighting those video image areas within a frame which a user has selected.

9. The method of claim 8, further comprising displaying video images from a selected video image area on a corresponding predefined area of the display screen.

10. The method of claim 9, wherein the corresponding predefined area comprises a surface of a multi-dimensional object.

11. The method of claim 10, further comprising storing the decoded electronic program guide data stream in a memory as a texture map mapping video images from each selected video image area to a corresponding surface of the multi-dimensional object; and displaying the video images from the selected video image area comprises binding video images from each selected video image area to its corresponding surface.

12. A system comprising:
a combining circuit to combine a plurality of different input video streams into a single output video stream, such that the output video stream includes an electronic program guide configured to display a mosaic of a plurality of videos, each input video stream of the combined plurality of different input video streams comprising a low resolution version of a high resolution video stream which is transmitted on a first channel, each of the videos being displayed immediately adjacent each other and the mosaic having no frame between each of the videos of the plurality of videos, each of the videos corresponding to each of the different input video streams of the plurality of input video streams; and a transmission circuit to transmit the single output video stream to a plurality of receivers on a second channel simultaneously with the transmission of the high resolution video stream on the first channel, the second channel being different from the first channel.

13. The system of claim 12, further comprising an image processing circuit to generate each of the plurality of input video streams.

14. The system of claim 13, wherein the image processing circuit comprises a size conversion circuit to reduce a resolution of a video image in each of the plurality of input video streams to be televised.

15. The system of claim 12, wherein the combining circuit comprises an encoding and multiplexing circuit to encode and multiplex the plurality of input video streams into the single output video stream comprising data packets identified by a unique packet identifier.

16. A system comprising:
a receiving circuit to receive on a first channel, an electronic program guide data stream comprising multiple video streams, each of the multiple video streams of the electronic program guide data stream corresponding to a different video image, which have been encoded and multiplexed for transmission on the first channel, each video stream of the electronic program guide data stream comprising a low resolution version of a high resolution video stream which is being simultaneously received on a second channel;

a decoding circuit to decode the electronic program guide data stream into frames, each frame defining a mosaic-style video image comprising video image areas for images in the electronic program guide data stream corresponding to each different video image from each of the multiple video streams, each of the video image areas being immediately adjacent each other and the mosaic-style image including no frame between each video image area; and a display circuit to simultaneously display each of the frames including each of the different video images on a display screen coupled to the system.

17. The system of claim 16, wherein the display circuit displays each frame in a portion of the display screen and simultaneously displays video images associated with a selected channel on a remainder of the display screen.

18. The system of claim 16, further comprising an input circuit to receive user input selecting a particular video image area within a frame for display, and to select the particular video image area in response to the user input.

19. The system of claim 18, wherein the display circuit highlights those video image areas within a frame which a user has selected.

20. The system of claim 19, wherein the display circuit displays video images from a selected video image area on a corresponding predefined area of the display screen.

21. The system of claim 20, wherein the corresponding predefined area comprises a surface of a multi-dimensional object.

22. The system of claim 21, further comprising a memory to store the decoded electronic program guide data stream as a texture map mapping video images from each selected video image area to a corresponding surface of the multi-dimensional object.

23. The system of claim 22, wherein the display circuit displays the video images from the selected video image area by binding the video images for each selected video image area to its corresponding surface.

24. A system comprising:
combining means for combining a plurality of different input video streams into a single output video stream, such that the output video stream includes an electronic program guide configured to display a mosaic of a plurality of videos, each input video stream of the combined plurality of different input video streams comprising a low resolution version of a high resolution video stream which is transmitted on a first channel, each of the videos being immediately adjacent each other and the mosaic including no frame between each of the videos of the plurality of videos, each of the videos corresponding to each of the different input video streams of the plurality of input video streams; and
transmission means for transmitting the single output video stream to a plurality of receivers on a second channel simultaneously with the transmission of the high resolution video stream on the first channel, the second channel being different from the first channel.

25. The system of claim 24, further comprising video processing means for generating each of the plurality of input video streams.

26. The system of claim 25, wherein video processing means operates to apply a size conversion function to each of the plurality of input video streams to be televised in order to reduce a resolution of a video image therein.

27. The method of claim 24, wherein the combining means operates to encode and multiplex the plurality of input video streams into the single output video stream comprising data packets identified by a unique packet identifier.

28. A system comprising:
receiving means for receiving, on a first channel, an electronic program guide data stream comprising multiple video streams, each of the multiple video streams of the electronic program guide data stream corresponding to a different video image, which have been encoded and multiplexed for transmission on the first channel, each video stream of the electronic program guide data stream comprising a low resolution version of a high resolution video stream which is being simultaneously received on a second channel;
decoding means for decoding the electronic program guide data stream into frames, each frame defining a mosaic-style image comprising video image areas for video images in the electronic program guide data stream corresponding to each different video image from each of the multiple video streams, each of the video image areas being immediately adjacent each other and the mosaic style image including no frame between the video image areas; and
display means for simultaneously displaying each of the frames on a display screen coupled to the system.

29. The system of claim 28, wherein the display means displays each frame on a portion of the display screen, while displaying video images associated with a selected channel on a remainder of the display screen.

30. The system of claim 28, further comprising input means for receiving user input to select a particular video image area within a frame for display; and selecting the particular video image area based on the user input.

31. The system of claim 30, wherein the display means highlights those video image areas within a frame which a user has selected.

32. The system of claim 31, wherein the display means displays video images from a selected video image area on a corresponding predefined area of the display screen.

33. The system of claim 32, wherein the corresponding predefined area comprises a surface of a multi-dimensional object.

34. The system of claim 33, further comprising image storage means for storing the decoded electronic program guide data stream as a texture map mapping images from each selected video image area to a corresponding surface of the multi-dimensional object, the display means then operating to bind video images from each video image area to its corresponding surface.

* * * * *